United States Patent
Howard

(10) Patent No.: US 12,120,471 B2
(45) Date of Patent: *Oct. 15, 2024

(54) SYSTEM AND METHOD FOR INTERACTIVE PROJECTION

(71) Applicant: Omni Consumer Products, LLC, Addison, TX (US)

(72) Inventor: Stephen Howard, Dallas, TX (US)

(73) Assignee: Omni Consumer Products, LLC, Addison, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/582,969

(22) Filed: Jan. 24, 2022

(65) Prior Publication Data

US 2022/0247984 A1 Aug. 4, 2022

Related U.S. Application Data

(63) Continuation of application No. 14/985,044, filed on Dec. 30, 2015, now Pat. No. 11,233,981.
(Continued)

(51) Int. Cl.
*H04N 9/31* (2006.01)
*G03B 17/54* (2021.01)
(Continued)

(52) U.S. Cl.
CPC ......... *H04N 9/3185* (2013.01); *G06F 3/0304* (2013.01); *G06F 3/0425* (2013.01);
(Continued)

(58) Field of Classification Search
CPC .. H04N 9/3185; H04N 9/3147; H04N 9/3194; G06V 20/52; G06F 3/0304;
(Continued)

(56) References Cited

U.S. PATENT DOCUMENTS 4,843,410 A * 6/1989 Kallenberg ............ G03B 15/10
396/3
5,528,263 A 6/1996 Platzker et al.
(Continued)

FOREIGN PATENT DOCUMENTS

EP 2 210 532 A2 7/2010
EP 2 397 932 A1 12/2011
WO WO-2009/031633 A1 3/2009

OTHER PUBLICATIONS

International Search Report and Written Opinion of the International Searching Authority received in Patent Cooperation Treaty Application No. PCT/US2015/068192, dated May 20, 2016, 11 pages.

*Primary Examiner* — John W Miller
*Assistant Examiner* — Omer Khalid
(74) *Attorney, Agent, or Firm* — Mirna Abyad

(57) ABSTRACT

An interactive projection system and method comprising a camera/projector unit having a computer processor connected via a network to a content server and content database. The system projects interactive trigger areas on a three-dimensional object. Specific content stored on the content server or locally in the memory of the computer processor is associated with each trigger area. A user interacts with the trigger areas and the system projects informational or entertainment content about the object on the surface of the object.

17 Claims, 26 Drawing Sheets

Related U.S. Application Data

(60) Provisional application No. 62/097,769, filed on Dec. 30, 2014.

(51) Int. Cl.

| | | |
|---|---|---|
| *G03B 21/26* | (2006.01) | |
| *G06F 3/03* | (2006.01) | |
| *G06F 3/042* | (2006.01) | |
| *G06T 3/08* | (2024.01) | |
| *G06V 20/52* | (2022.01) | |

(52) U.S. Cl.
CPC ............... *G06T 3/08* (2024.01); *G06V 20/52* (2022.01); *H04N 9/3147* (2013.01); *H04N 9/3194* (2013.01); *G03B 17/54* (2013.01); *G03B 21/26* (2013.01); *G03B 2206/00* (2013.01)

(58) Field of Classification Search
CPC ....... G06F 3/0425; G06T 3/005; G03B 17/54; G03B 21/26; G03B 2206/00
USPC .......................................................... 348/100
See application file for complete search history.

(56) References Cited

U.S. PATENT DOCUMENTS

| | | |
|---|---|---|
| 5,933,132 A | 8/1999 | Marshall et al. |
| 6,031,519 A | 2/2000 | O'Brien |
| 6,339,748 B1 | 1/2002 | Hiramatsu |
| 6,512,536 B1 | 1/2003 | Ross |
| 6,759,979 B2 | 7/2004 | Vashisth et al. |
| 7,034,807 B2 | 4/2006 | Maggioni |
| 7,046,838 B1 | 5/2006 | Sakagawa et al. |
| 7,084,857 B2 | 8/2006 | Lieberman et al. |
| RE40,368 E | 6/2008 | Arnon |
| 7,598,942 B2 | 10/2009 | Underkoffler et al. |
| 8,094,129 B2 | 1/2012 | Izadi et al. |
| 8,331,998 B2 | 12/2012 | Baratono et al. |
| 2002/0083140 A1 | 6/2002 | Shin et al. |
| 2003/0120611 A1 | 6/2003 | Yoshino et al. |
| 2006/0004280 A1 | 1/2006 | Kotake et al. |
| 2006/0249679 A1 | 11/2006 | Johnson et al. |
| 2007/0170421 A1 | 7/2007 | Liao et al. |
| 2007/0217042 A1 | 9/2007 | Kweon |
| 2008/0029691 A1 | 2/2008 | Han |
| 2009/0114786 A1* | 5/2009 | Meyer .................. F16M 11/28 70/20 |
| 2009/0153652 A1 | 6/2009 | Barenbrug |
| 2009/0325686 A1 | 12/2009 | Davis et al. |
| 2010/0066694 A1 | 3/2010 | Jonsdottir |
| 2010/0302138 A1 | 12/2010 | Poot et al. |
| 2010/0321379 A1 | 12/2010 | Kang et al. |
| 2011/0102438 A1 | 5/2011 | Mathe et al. |
| 2011/0170768 A1 | 7/2011 | Alldrin et al. |
| 2011/0242103 A1 | 10/2011 | Han et al. |
| 2011/0292347 A1* | 12/2011 | Zhang .................... G03B 21/00 353/121 |
| 2012/0035934 A1* | 2/2012 | Cunningham .......... G06F 3/165 704/260 |
| 2012/0044141 A1 | 2/2012 | Ueshima et al. |
| 2012/0113223 A1* | 5/2012 | Hilliges ................ G06F 3/011 348/46 |
| 2012/0162077 A1 | 6/2012 | Sze et al. |
| 2012/0212413 A1 | 8/2012 | Plagemann et al. |
| 2012/0262366 A1 | 10/2012 | Zhu et al. |
| 2012/0268371 A1 | 10/2012 | Takahashi |
| 2012/0299879 A1 | 11/2012 | Kim |
| 2012/0326958 A1 | 12/2012 | Deuel et al. |
| 2013/0006814 A1 | 1/2013 | Inoue et al. |
| 2013/0127705 A1 | 5/2013 | Jung et al. |
| 2013/0194182 A1 | 8/2013 | Tarama et al. |
| 2013/0257748 A1 | 10/2013 | Ambrus et al. |
| 2013/0329966 A1 | 12/2013 | Hildreth |
| 2014/0253692 A1* | 9/2014 | Wilson ................ H04N 13/275 348/47 |
| 2014/0254880 A1* | 9/2014 | Srinivasan ................ G06T 7/74 382/106 |
| 2015/0363070 A1* | 12/2015 | Katz ................ G06F 3/04815 715/852 |

\* cited by examiner

1654

1656

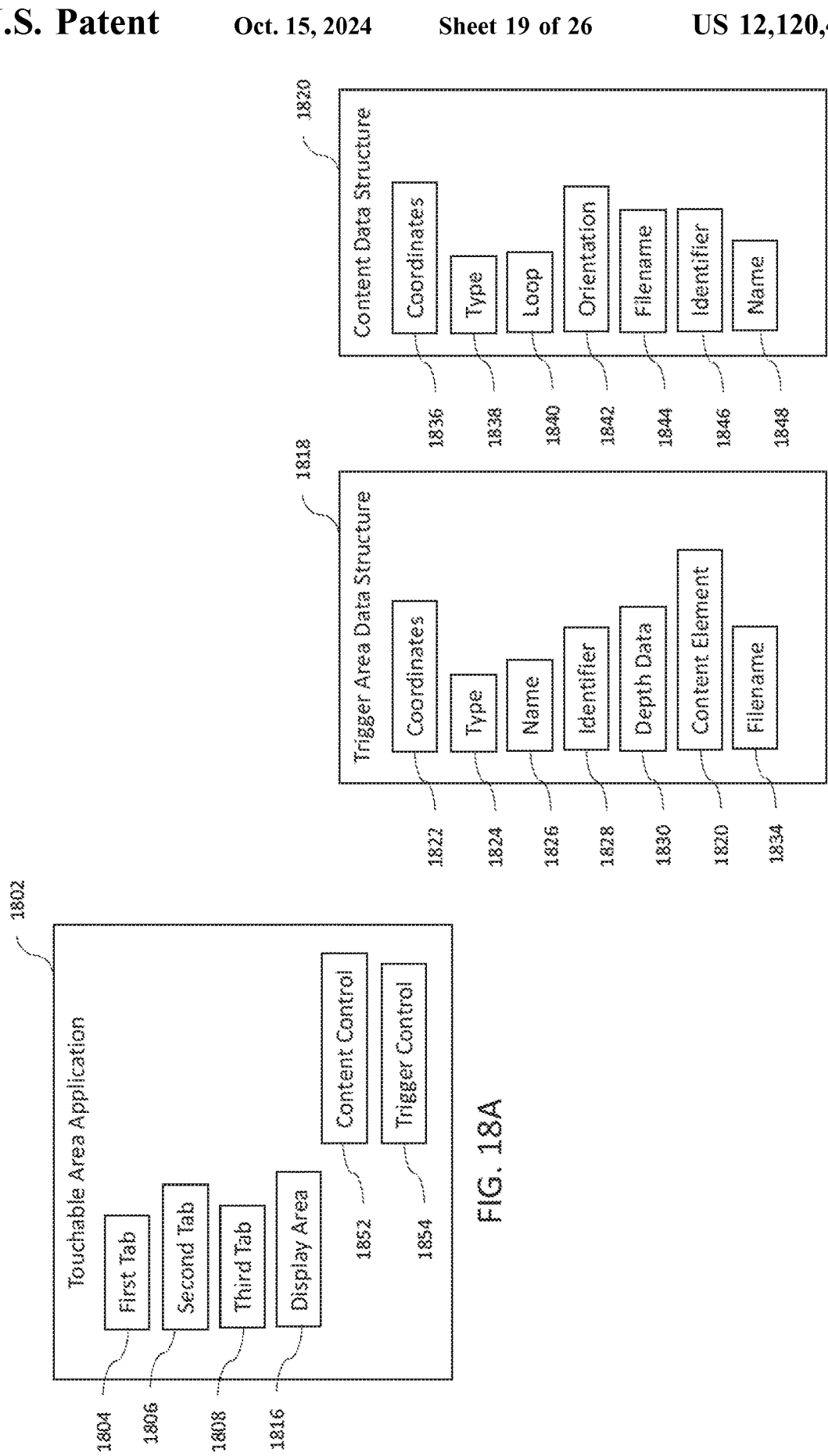

SYSTEM AND METHOD FOR INTERACTIVE PROJECTION

CROSS REFERENCE TO RELATED APPLICATION

This application is a continuation of U.S. application Ser. No. 14/985,044 filed Dec. 30, 2015, issuing as U.S. Pat. No. 11,233,981 on Jan. 25, 2022, which claims the benefit of U.S. Provisional Patent Application No. 62/097,769, filed Dec. 30, 2014, the disclosures of which are hereby incorporated herein by reference in their entirety.

FIELD OF THE INVENTION

The disclosure relates to systems and methods for projecting images. In particular, the disclosure relates to a system and method for projection of interactive areas and mapping of the interactive areas onto complex surfaces.

BACKGROUND OF THE INVENTION

Active product displays are useful in demonstrating advanced features of various products. Prior art systems are typically passive display systems, in that content is presented to a viewer on a screen with little opportunity for feedback. In other prior art systems, a touch screen computer is employed to allow the viewer to select content for review and to provide feedback. However, these systems require extensive custom set-up or are prohibitively expensive. Further, these systems require extensive maintenance due to frequent wear on the touch screen.

For example, U.S. Pat. No. 7,598,942 to Underkoffler, et al. discloses a gestural interface to visually presented elements on a display screen. Multiple cameras capture movement and detect location and orientation and generate output signals to processors connected to a computer. The processors translate the camera outputs into gestural signals which are interpreted as input information. The computer uses the input information to generate commands to control computer functions.

U.S. Pat. No. 7,034,807 to Maggioni discloses a system for interaction with a display. The system includes a recording unit for recording a pointer object in the vicinity of the display. A computer is connected to the recording unit and is used to determine a position of the pointer object. The system requires multiple cameras and multiple reflective surfaces.

U.S. Patent Publication No. 2012/0212413 to Plagemann, et al. discloses a system for receiving image information and translating it into computer instructions. Image information is received for a single predetermined action space to identify motion. A camera combined with mirrors, prisms, or optic cables is used to gather the image information. However, only one action area is monitored at any given time.

U.S. Patent Publication No. 2012/0162077 to Sze, et al. discloses an input device used to detect locations and motions of objects in a virtual working area. A camera is directed to a region of interest. A region of interest is illuminated by a "flat" beam of light. An object is placed in the region of interest and illuminated. The camera captures an image of the object and sends it to the processor. The processor processes the image to obtain locations and movements. Based on the movements, the processor produces computer instructions.

Therefore, there is a need for a system and method for projecting an interactive environment for a display. The system should provide options for the user to actively select the content to view. The system should be easy to set up and should be capable of being easily transported to other locales.

SUMMARY OF THE INVENTION

The system disclosed projects a "touchable" image on a three-dimensional object which enables user interaction. The touchable image is defined by a trigger area and a content area.

The system includes an infrared camera and a projector connected to a computer processor. In one embodiment, a content server and content database are also connected to the computer via a network. Content to be projected is stored in the database. During set-up, the system captures a baseline image of a three-dimensional target surface. The system then transforms the content to correct for projector position and for target curvature. During operation, the corrected content image is projected onto the three-dimensional target surface along with similarly transformed image of the trigger area. The infrared camera then monitors the trigger area for a trigger event and reports it to the server when it occurs. A trigger event occurs when an object is placed inside the trigger area for a predetermined period of time. Upon report of a trigger event, the system fetches the additional stored content, transforms it, and projects it onto the target surface. The computer processor uses both affine and a non-affine transforms to translate and "warp" the content image to match the surface of the target object.

In an alternate embodiment, the system uses facial recognition software to project predefined content associated with a particular recognized user on the surface of the object.

The action areas can be comprised of a plurality of separately defined actions areas each corresponding to different content. When a user interacts with an action area, the system recognizes the presence of a user and projects the associated content.

The affine transformations can be described through linear algebra. In linear algebra, linear transformations can be represented by matrices. If T is a linear transformation mapping $R^n$ to $R^m$ and $\vec{x}$ is a column vector with n entries, then $T(\vec{x}) = A\vec{x}$.

For some m×n matrix A, called the transformation matrix of T. There are alternative expressions of transformation matrices involving row vectors that are preferred by some authors.

Matrices allow arbitrary linear transformations to be represented in a consistent format, suitable for computation. This also allows transformations to be concatenated easily (by multiplying their matrices).

Linear transformations are not the only ones that can be represented by matrices. Some transformations that are non-linear on a n-dimensional Euclidean space $R^n$, can be represented as linear transformations on the n+1-dimensional space $R^{n+1}$. These include both affine transformations (such as translation) and projective transformations. For this reason, 4×4 transformation matrices are widely used in 3D computer graphics. These n+1-dimensional transformation matrices are called, depending on their application, affine transformation matrices, projective transformation matrices, or more generally non-linear transformation matrices. With respect to an n-dimensional matrix, an n+1-dimensional matrix can be described as an augmented matrix.

In the physical sciences, an active transformation is one which actually changes the physical position of a system, and makes sense even in the absence of a coordinate system whereas a passive transformation is a change in the coordinate description of the physical system (change of basis). The distinction between active and passive transformations is important. By default, by transformation, mathematicians usually mean active transformations, while physicists could mean either.

Put differently, a passive transformation refers to description of the same object as viewed from two different coordinate frames.

If one has a linear transformation T(x) in functional form, it is easy to determine the transformation matrix A by transforming each of the vectors of the standard basis by T, then inserting the result into the columns of a matrix. In other words, $$A = [T(\vec{e}_1) T(\vec{e}_2) \ldots T(\vec{e}_n)] \qquad \text{Eq. 1}$$

For example, the function T(x)=5x is a linear transformation. Applying the above process (suppose that n=2 in this case) reveals that $$T(\vec{x}) = 5\vec{x} = 5I\vec{x} = \begin{bmatrix} 5 & 0 \\ 0 & 5 \end{bmatrix} \vec{x} \qquad \text{Eq. 2}$$

It must be noted that the matrix representation of vectors and operators depends on the chosen basis; a similar matrix will result from an alternate basis. Nevertheless, the method to find the components remains the same.

Mathematically, vector v can be represented in basis vectors, $E = [\vec{e}_1 \vec{e}_2 \ldots \vec{e}_n]$ with coordinates $[v]_E = [v_1 v_2 \ldots v_n]^T$:

$$\vec{v} = v_1 \vec{e}_1 + v_2 \vec{e}_2 + \cdots + v_n \vec{e}_n = \Sigma v_i \vec{e}_i = E[v]_E \qquad \text{Eq. 3}$$

Now, express the result of the transformation matrix A upon $\vec{v}$, in the given basis:

$$A(\vec{v}) = A\left(\sum v_i \vec{e}_i\right) = \sum v_i A(\vec{e}_i) = [A(\vec{e}_1) A(\vec{e}_2) \ldots A(\vec{e}_n)][v]_E = \qquad \text{Eq. 4}$$

$$A \cdot [v]_E = [\vec{e}_1 \vec{e}_2 \ldots \vec{e}_n] \begin{bmatrix} a_{1,1} & a_{1,2} & \ldots & a_{1,n} \\ a_{2,1} & a_{2,2} & \ldots & a_{2,n} \\ \vdots & \vdots & \ddots & \vdots \\ a_{n,1} & a_{n,2} & \ldots & a_{n,n} \end{bmatrix} \begin{bmatrix} v_1 \\ v_2 \\ \vdots \\ v_n \end{bmatrix}$$

The $a_{i,j}$ elements of matrix A are determined for a given basis E by applying A to every $\vec{e}_j = [00 \ldots (v_j=1) \ldots 0]^T$, and observing the response vector $A\vec{e}_j = a_{1,j}\vec{e}_1 + a_{2,j}\vec{e}_2 + \cdots + a_{n,j}\vec{e}_n = \Sigma a_{i,j}\vec{e}_i$. This equation defines the elements, $a_{i,j}$, of j-th column of the matrix A.

To represent affine transformations with matrices, we can use homogeneous coordinates. This means representing a 2-vector (x, y) as a 3-vector (x, y, 1), and similarly for higher dimensions. Using this system, translation can be expressed with matrix multiplication. The functional form $x' = x + t_x$; $y' = y + t_y$ becomes:

$$\begin{bmatrix} x' \\ y' \\ 1 \end{bmatrix} = \begin{bmatrix} 1 & 0 & t_x \\ 0 & 1 & t_y \\ 0 & 0 & 1 \end{bmatrix} \begin{bmatrix} x \\ y \\ 1 \end{bmatrix} \qquad \text{Eq. 5}$$

All ordinary linear transformations are included in the set of affine transformations, and can be described as a simplified form of affine transformations. Therefore, any linear transformation can also be represented by a general transformation matrix. The latter is obtained by expanding the corresponding linear transformation matrix by one row and column, filling the extra space with zeros except for the lower-right corner, which must be set to 1. For example, the clockwise rotation matrix from above becomes:

$$\begin{bmatrix} \cos\theta & \sin\theta & 0 \\ -\sin\theta & \cos\theta & 0 \\ 0 & 0 & 1 \end{bmatrix} \qquad \text{Eq. 6}$$

Using transformation matrices containing homogeneous coordinates, translations can be seamlessly intermixed with all other types of transformations. The reason is that the real plane is mapped to the w=1 plane in real projective space, and so translation in real Euclidean space can be represented as a shear in real projective space. Although a translation is a non-linear transformation in a 2-D or 3-D Euclidean space described by Cartesian coordinates, it becomes, in a 3-D or 4-D projective space described by homogeneous coordinates, a simple linear transformation (a shear).

More affine transformations can be obtained by composition of two or more affine transformations. For example, given a translation T' with vector $(t'_x, t'_y)$, a rotation R by an angle θ counter-clockwise, a scaling S with factors $(s_x, s_y)$ and a translation T of vector $(t_x, t_y)$, the result M of T'RST is:

$$\begin{bmatrix} s_x\cos\theta & -s_y\sin\theta & t_x s_x\cos\theta - t_y s_y\sin\theta + t'_x \\ s_x\sin\theta & s_y\cos\theta & t_x s_x\sin\theta + t_y s_y\cos\theta + t'_y \\ 0 & 0 & 1 \end{bmatrix} \qquad \text{Eq. 7}$$

When using affine transformations, the homogeneous component of a coordinate vector (normally called w) will never be altered. One can therefore safely assume that it is always 1 and ignore it. However, this is not true when using perspective projections.

Another type of transformation, of particular importance to this disclosure, is the perspective projection. Whereas parallel projections are used to project points onto the image plane along parallel lines, the perspective projection projects points onto the image plane along lines that emanate from a single point, called the center of projection. This means that an object has a smaller projection when it is far away from the center of projection and a larger projection when it is closer. This transformation is used to correct for the position of the projector relative to the three-dimensional target object.

The simplest perspective projection uses the origin as the center of projection, and z=1 as the image plane. The functional form of this transformation is then x'=x/z; y'=y/z. We can express this in homogeneous coordinates as:

$$\begin{bmatrix} x_c \\ y_c \\ z_c \\ w_c \end{bmatrix} = \begin{bmatrix} 1 & 0 & 0 & 0 \\ 0 & 1 & 0 & 0 \\ 0 & 0 & 1 & 0 \\ 0 & 0 & 1 & 0 \end{bmatrix} \begin{bmatrix} x \\ y \\ z \\ w \end{bmatrix} \qquad \text{Eq. 8}$$

After carrying out the matrix multiplication, the homogeneous component $w_c$ will, in general, not be equal to 1. Therefore, to map back into the real plane we must perform the homogeneous divide or perspective divide by dividing each component by $w_c$:

$$\begin{bmatrix} x' \\ y' \\ z' \\ 1 \end{bmatrix} = \frac{1}{w_c} \begin{bmatrix} x_c \\ y_c \\ z_c \\ w_c \end{bmatrix} \quad \text{Eq. 9}$$

More complicated perspective projections can be composed by combining this one with rotations, scales, translations, and shears to move the image plane and center of projection wherever they are desired.

Non-affine transformations such as transformation of a two-dimensional surface to a three-dimensional surface can be accomplished, in theory, by treating the three-dimensional surface as a distortion or, in other words, a deviation from true rectilinear projection. This type of transformation is used to correct for the complex shape of the three-dimensional target object.

Although distortion can be irregular or follow many patterns, the most commonly encountered distortions are radially symmetric, or approximately so. Radial distortions can usually be classified as either "barrel" distortions or "pincushion" distortions.

In barrel distortion, image magnification decreases with distance from the optical axis. The apparent effect is that of an image which has been mapped around a sphere (or barrel). Fisheye lenses, which take hemispherical views, utilize this type of distortion as a way to map an infinitely wide object plane into a finite image area. In a zoom lens barrel distortion appears in the middle of the lens's focal length range and is worst at the wide-angle end of the range.

In pincushion distortion, image magnification increases with the distance from the optical axis. The visible effect is that lines that do not go through the center of the image are bowed inwards, towards the center of the image, like a pincushion.

A mixture of both types, sometimes referred to as "mustache" distortion or complex distortion, is less common but not rare. It starts out as barrel distortion close to the image center and gradually turns into pincushion distortion towards the image periphery, making horizontal lines in the top half of the frame look like a handlebar mustache.

These distortions are radial distortions. They imply a nonlinear radius mapping from the object to the image. For example, what is seemingly pincushion distortion is simply an exaggerated radius mapping for large radii in comparison with small radii. Conversely, barrel distortion is simply a diminished radius mapping for large radii in comparison with small radii.

Radial distortion can be corrected using Brown's distortion model, also known as the Brown-Conrady model. The Brown-Conrady model corrects both for radial distortion and for tangential distortion caused by physical elements in a lens not being perfectly aligned. The latter is also known as decentering distortion.

$$x_d = x_u(1 + K_1 r^2 + K_2 r^4 + \cdots) + (P_2(r^2 + 2x_u^2) + 2P_1 x_u y_u)(1 + P_3 r^2 + P_4 r^4 + \cdots) \quad \text{Eq. 10}$$

$$y_d = y_u(1 + K_1 r^2 + K_2 r^4 + \cdots) + (P_1(r^2 + 2y_u^2) + 2P_2 x_u y_u)(1 + P_3 r^2 + P_4 r^4 + \cdots) \quad \text{Eq. 11}$$

where:
($x_d$, $y_d$) = distorted image point as projected on image plane using specified lens,
($x_u$, $y_u$) = undistorted image point as projected by an ideal pin-hole camera,
($x_c$, $y_c$) = distortion center (assumed to be the principal point),
$K_n = n^{th}$ = radial distortion coefficient,
$P_n = n^{th}$ tangential distortion coefficient,
$r = \sqrt{(x_u - x_c)^2 + (y_u - y_c)^2}$, and
... = an infinite series.

In our case, barrel and pincushion distortions are quadratic, meaning they increase as the square of distance from the center. In mustache distortion the quartic (degree 4) term is significant: in the center, the degree 2 barrel distortion is dominant, while at the edge the degree 4 distortion in the pincushion direction dominates. Other distortions are in principle possible—pincushion in center and barrel at the edge, or higher order distortions (degree 6, degree 8)—but do not generally occur in practical cases, and higher order distortions are small relative to the main barrel and pincushion effects.

Barrel distortion typically will have a negative term for $K_1$ whereas pincushion distortion will have a positive value. Moustache distortion will have a non-monotonic radial geometric series where for some r the sequence will change sign.

BRIEF DESCRIPTION OF DRAWINGS

Reference will now be made to the following drawings:

FIG. 18A is a diagram of a touchable area application in accordance with one embodiment of the disclosure.

FIG. 18B is a diagram of a trigger data structure in accordance with one embodiment of the disclosure.

FIG. 18C is a diagram of a content data structure in accordance with one embodiment of the disclosure.

FIG. 20B is a flow chart for determining a touch of a trigger area in

DETAILED DESCRIPTION

Figure 1:
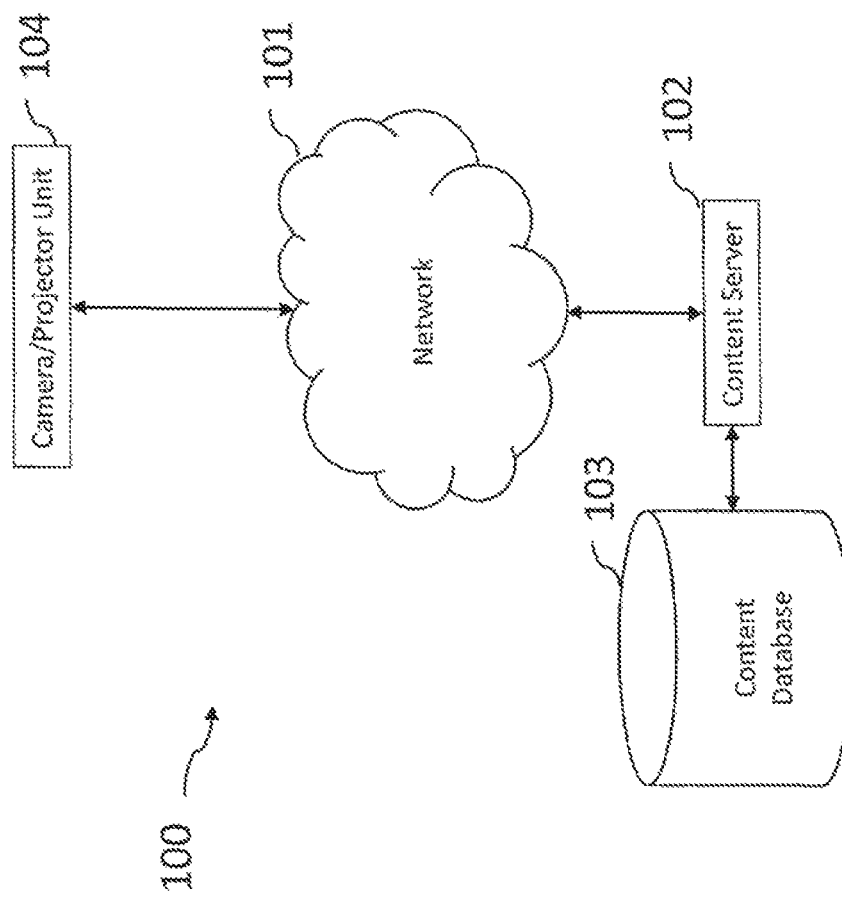
FIG. 1 is a system architecture diagram of a preferred embodiment.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware or combining software and hardware implementation that may all generally be referred to herein as a "circuit," "module," "component," or "system" (including firmware, resident software, micro-code, etc.). Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, markup languages, style sheets and JavaScript libraries, including but not limited to Windows Presentation Foundation (WPF), HTML/CSS, XAML, and JQuery.

Aspects of the present disclosure are described herein with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer interconnected with dedicated and special purpose electronic devices, or other dedicated programmable data processing apparatus to produce a machine, such that the instructions, which execute via the processor of the computer or other programmable data processing apparatus, create an integrated machine to implement the functions described in the flowchart and the block diagrams.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, system 100 includes network 101, content server 102 connected to network 101, and camera/projector unit 104 connected to network 101. Content server 102 is further connected to content database 103 for the storage of multimedia and other relevant data.

In a preferred embodiment, network 101 is a wide area network such as the internet, but can include other wide area and intranet networks.

In a preferred embodiment, camera/projector unit 104 downloads content stored in content database 103 from content server 102 and saved to local memory for later projection. In another embodiment, camera/projector unit 104 streams content stored in content database 103 from content server 102 for projection.

Figure 2A:
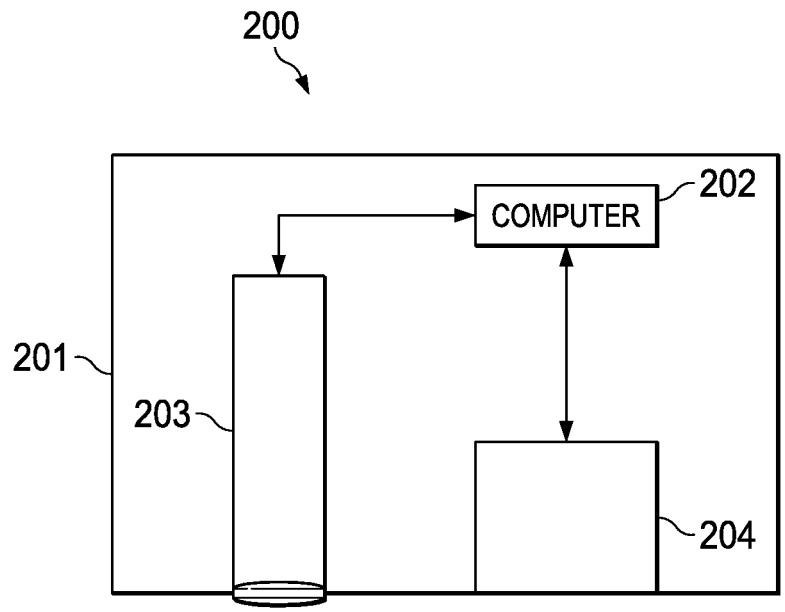
FIG. 2A is a schematic of a camera/projection unit of a preferred embodiment.

Referring to FIG. 2A in one embodiment, camera/projector unit 200 includes enclosure 201, computer/processor 202, projector 203 connected to computer/processor 202, and camera 204 connected to computer/processor 202.

Figure 2B:
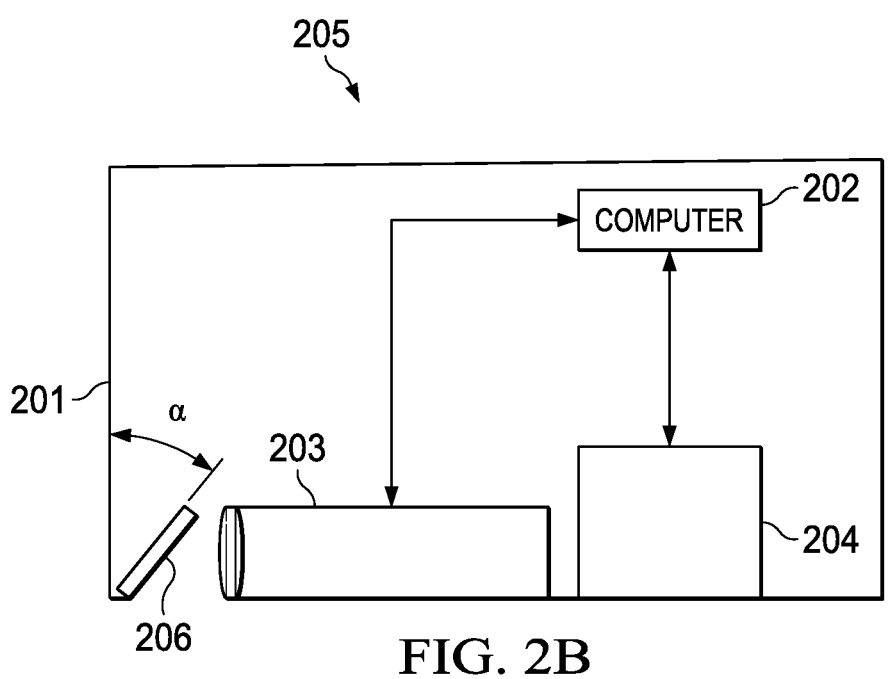
FIG. 2B is a schematic of a camera/projection unit of a preferred embodiment.

Referring to FIG. 2B in another embodiment, camera/projector unit 205 positions mirror 206 at angle a adjacent to projector 203 to redirect the field of view of projector 203.

In a preferred embodiment, computer/processor 202 is a laptop computer having a suitable processor and memory for storage of content and database, and any other relevant data. In another embodiment, computer/processor 202 is a tablet computer.

A projection application is stored in the memory of computer/processor 202 for defining and projecting a set of trigger areas with projector 203, detecting a user presence and recognizing the user with camera 204, detecting a selection of the set of trigger areas with camera 204, and projecting content with projector 203, as will be further described below.

In a preferred embodiment, camera 204 is a 3-D range camera, such as the Kinect camera from Microsoft Corporation. Camera 204 provides image data in the form of streaming video at the rate of 30 frames per second in a standard 640×480 VGA The focal length of the camera is 525 pixels with a field of view of approximately 63°. Camera 204 also provides distance-to-target information from an on-board infrared transmitter/receiver. The focal length of the infrared transmitter/receiver is 580 pixels with a field of view of approximately 58°. The infrared data is provided as a 16 bit number at a refresh rate of 200 µs.

Figure 3:
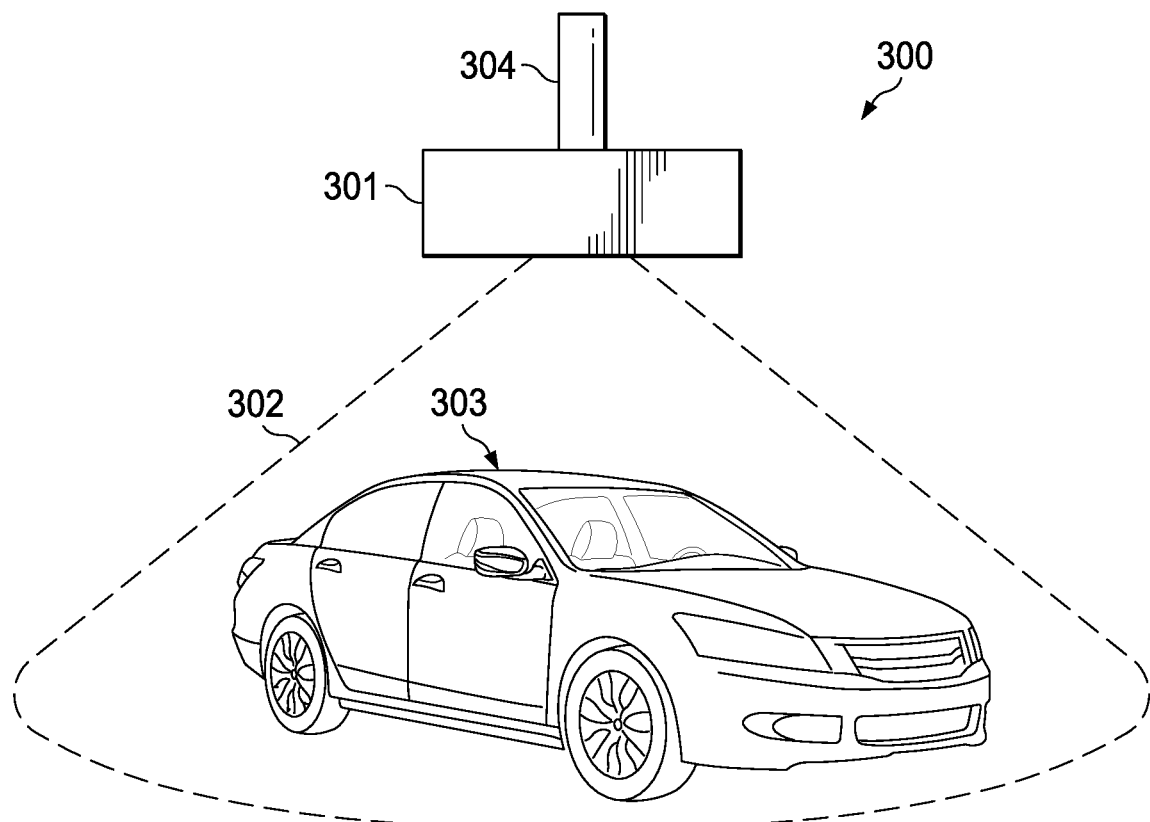
FIG. 3 is a plan view of a display of a preferred embodiment.

Referring to FIG. 3, display 300 includes camera/projector unit 301 having field of view 302. Camera/projector unit 301 is connected to arm 304. Arm 304 is attached to and extends from an overhead ceiling. In a preferred embodiment, field of view 302 can range from approximately 45° to 75°. Product 303 is positioned in field of view 302.

Figure 4:
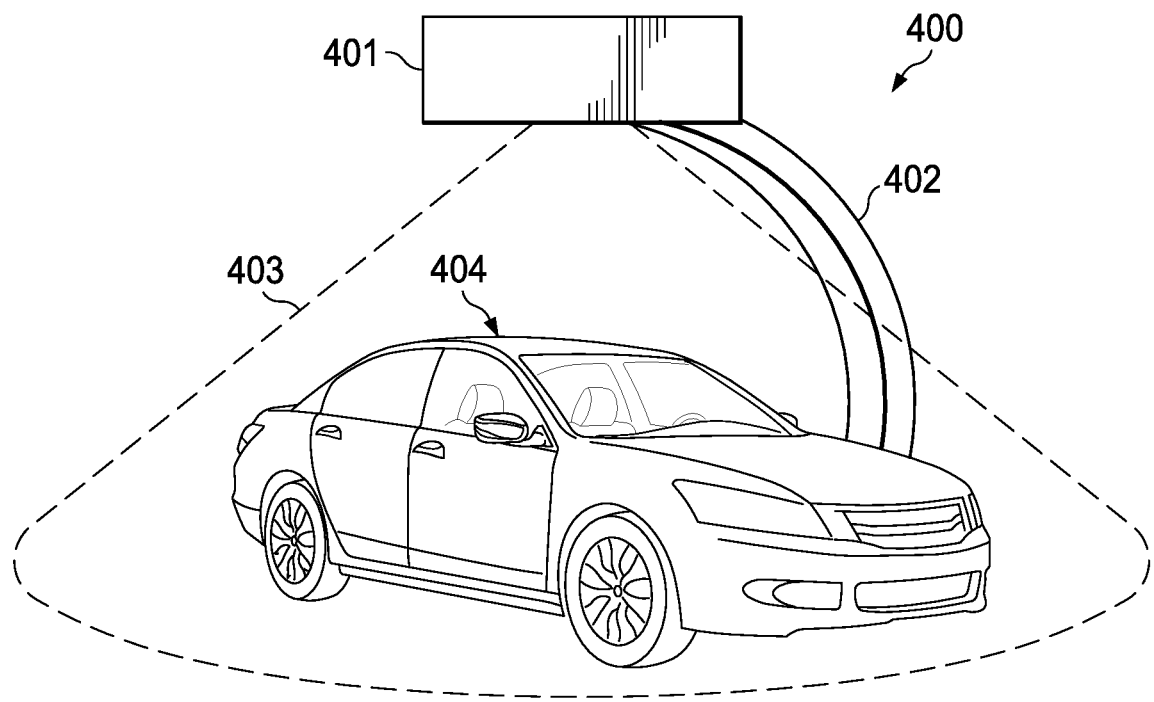
FIG. 4 is a plan view of a display of a preferred embodiment.

Referring to FIG. 4 in another embodiment, display 400 includes camera/projector unit 401 having field of view 403. Camera/projector unit 401 is connected to and supported by stand 402. Stand 402 is removably connected to the floor. Product 404 is positioned in field of view 403.

Figure 5:
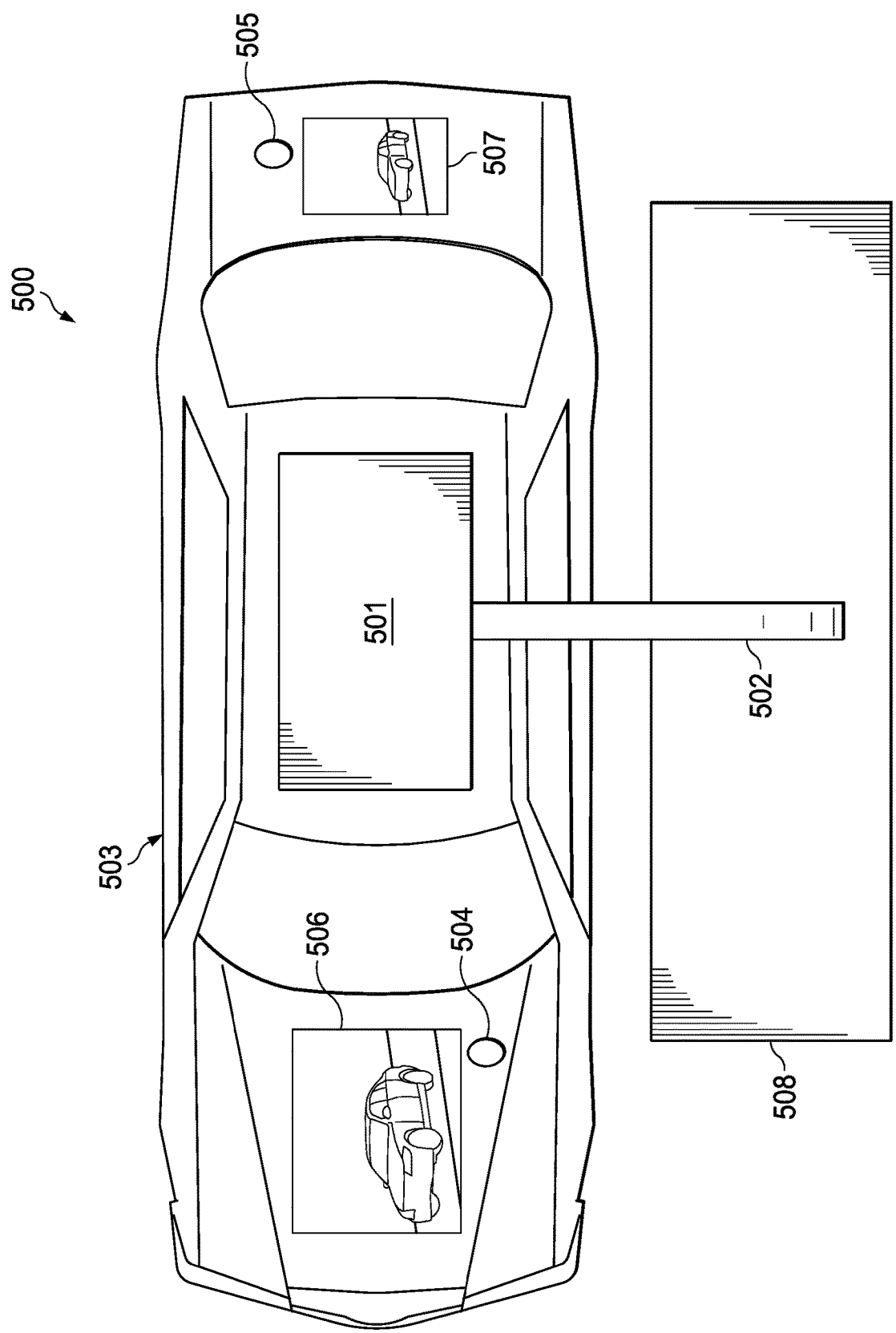
FIG. 5 is a top view of a display of a preferred embodiment.

Referring to FIG. 5, display 500 includes camera/projector unit 501 attached to arm 502 which is attached to base 508. Camera/projector unit 501 projects trigger areas 504 and 505 onto the surface of product 503. When a user touches the surface of product 503 in trigger areas 504 and 505, camera/projector unit 501 detects the presence of the user in trigger areas 504 and 505 and projects contents 506 and 507, respectively, onto the surface of product 503. In a preferred embodiment, each of contents 506 and 507 is a video. Any type of graphical images may be employed. For example, if a user touches the hood of the car shown in the drawing, an image of a running engine taken from the same perspective as the user may be projected on the hood to simulate a "see through" effect to alert the user to "see" the running engine through the hood.

Figure 6:
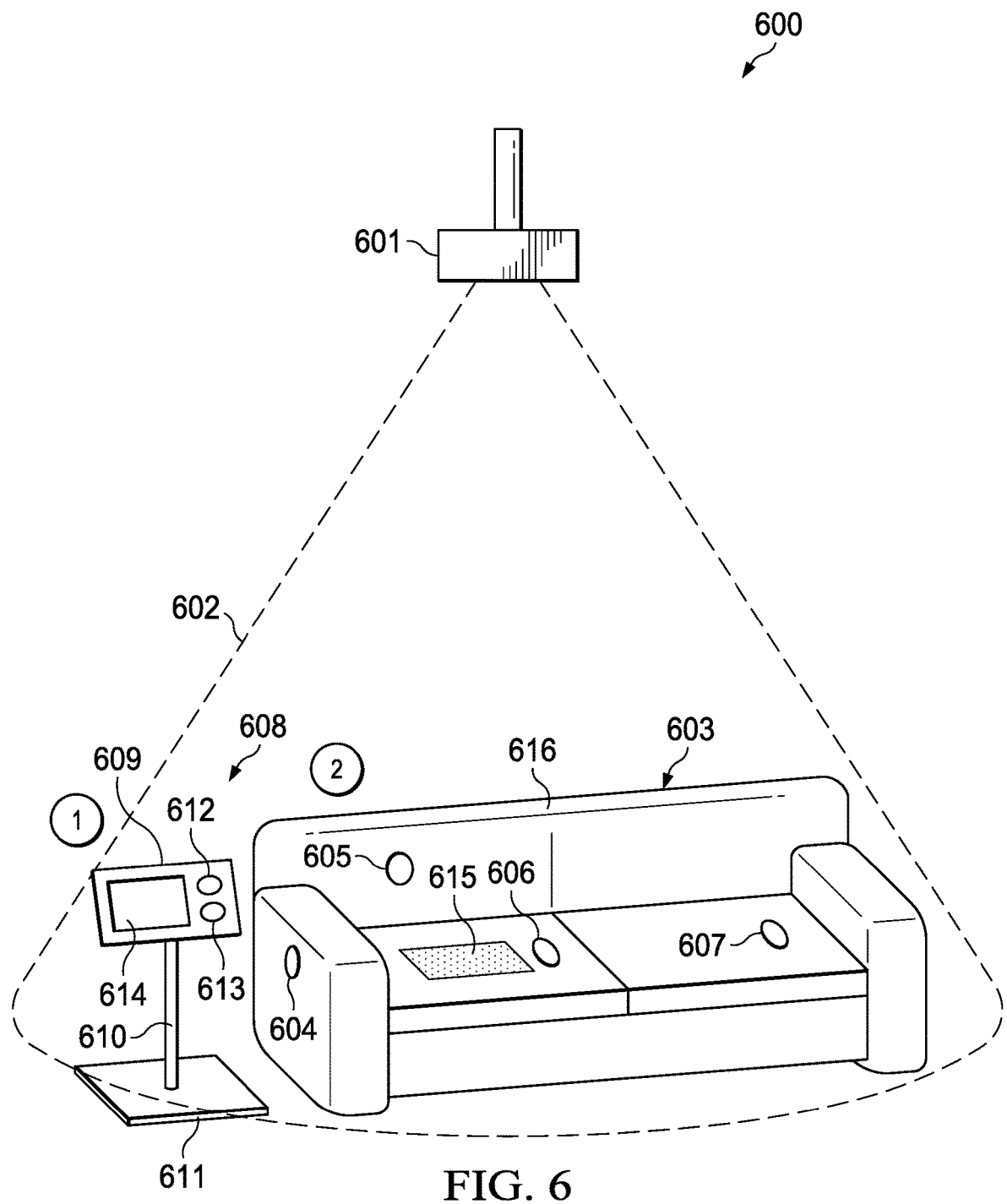
FIG. 6 is a plan view of a display of a preferred embodiment.

Referring to FIG. 6 in another embodiment, display 600 includes camera/projector unit 601 having field of view 602 covering product 603. Camera/projector unit 601 projects trigger areas 604, 605, 606, and 607 onto the surface of product 603. When a user touches the surface of product in trigger areas 604, 605, 606, and 607, camera/projector unit 601 projects content 615 onto the surface of product 603.

In one embodiment, if a user touches the surface of product 603 in any of the trigger areas 604, 605, 606, and 607, camera/projector unit 601 projects a different color/pattern 616 onto product 603, thereby enabling the user to visualize a potential change to the color or pattern of product 603.

Stand 608 is positioned adjacent to product 603 and is covered by field of view 602. Stand 608 includes placard 609, support 610 attached to placard 609, and base 611 attached to support 610. Base 611 is removably attached to the floor. Camera/projector unit 601 projects trigger areas 612 and 613 onto the surface of placard 609. When a user touches the surface of placard 609 in trigger areas 612 and 613, camera/projector unit 601 projects content 614 onto placard 609, thereby transforming placard 609 into an interactive digital sign. Content 614 preferably includes information, videos, and/or pictures of product 603. Content 614 is retrieved from the content server or from the local memory of camera/projector unit 601.

Figure 7:
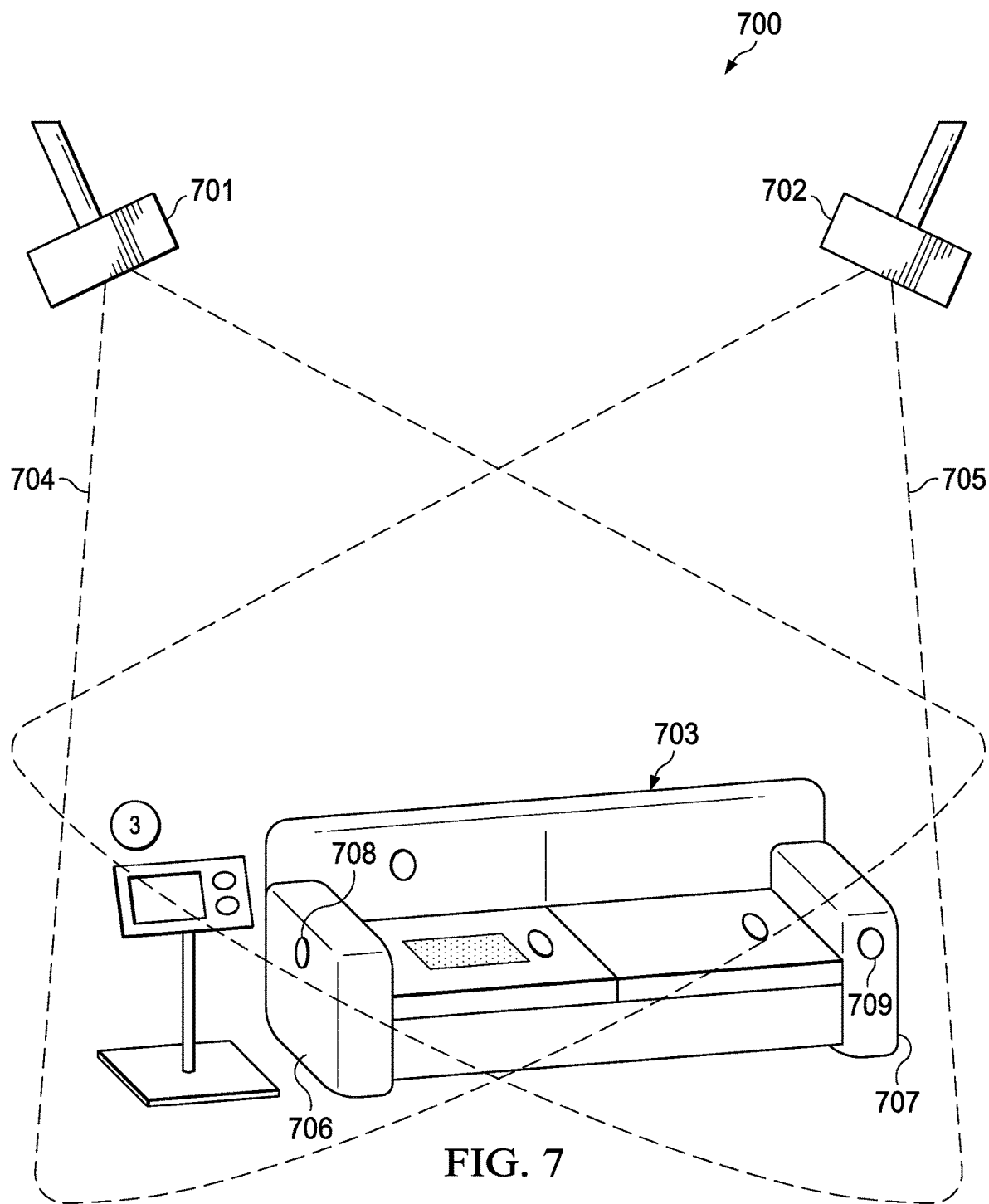
FIG. 7 is a plan view of a display of a preferred embodiment.

Referring to FIG. 7, display 700 includes camera/projector units 701 and 702. Camera/projector unit 701 has field of view 704 covering product 703 including product side 706. Camera/projector unit 702 has field of view 705 covering product 703 including product side 707. Camera/projector unit 701 projects trigger area 708 onto the surface of product side 706. When a user touches the surface of product side 706 in trigger area 708, camera/projector unit 701 projects a video or graphics content onto the surface of product side 706. Camera/projector unit 702 projects trigger area 709 onto the surface of product side 707. When the user touches the surface of product side 707 in trigger area 709, camera/projector unit 702 projects a video or graphics content onto the surface of product side 707.

Figure 8:
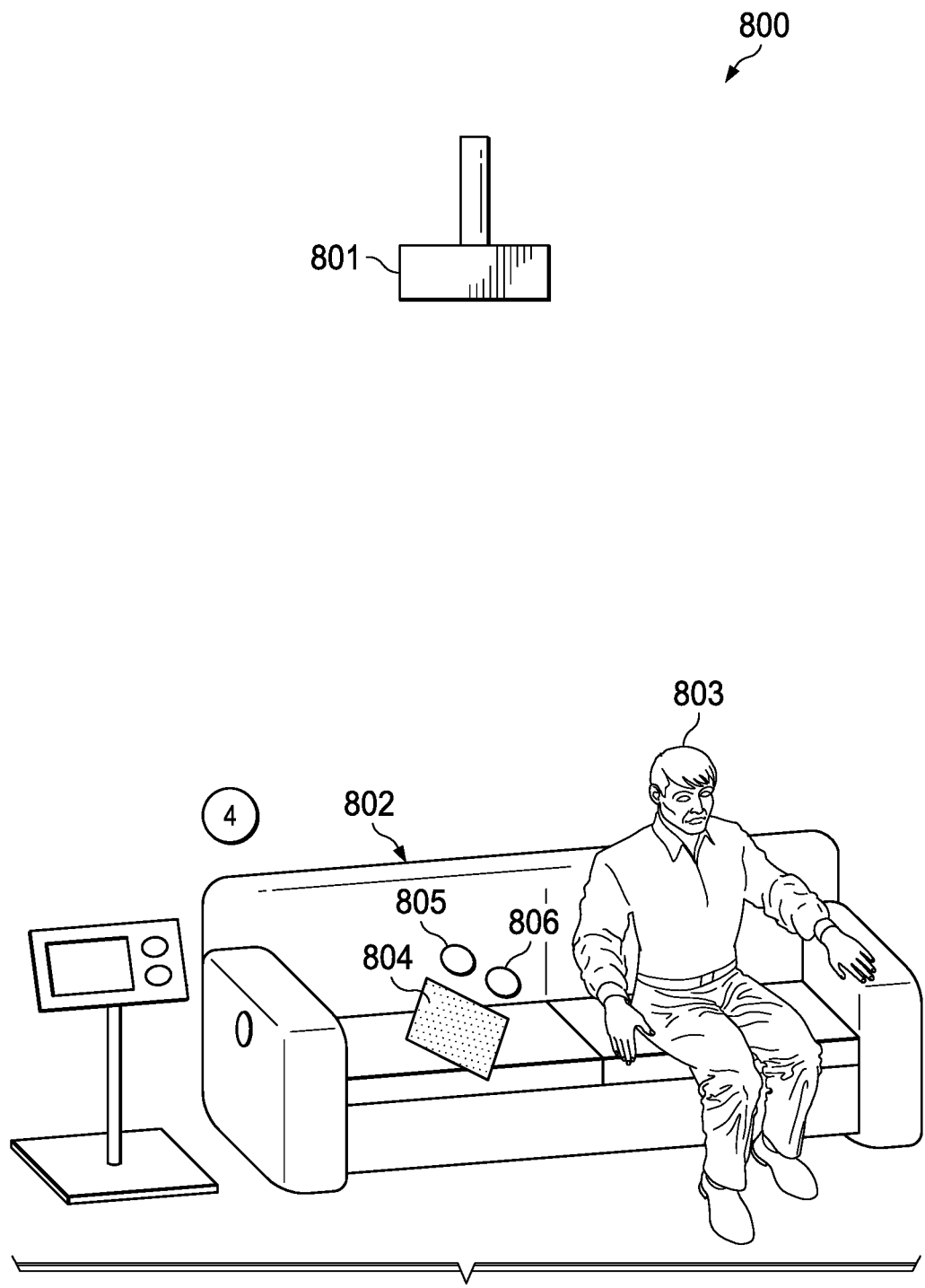
FIG. 8 is a plan view of a display of a preferred embodiment.

Referring to FIG. 8 in another embodiment, display 800 includes product 802 positioned in view of camera/projector unit 801. Camera/projector unit 801 detects the position and presence of user 803 on product 802. In one embodiment, an identity of user 803 is determined through a facial recognition process, as will be further described below. Trigger areas 805 and 806 are projected by camera/projector 801 onto the surface of product 802 adjacent to user 803 in response to the presence of user 803.

In one embodiment, content 804 is automatically projected onto the surface of product 802 in response to the presence and identity of user 803.

In another embodiment, content 804 is projected onto the surface of product 802 in response to user 803 touching any of trigger areas 805 and 806.

In another embodiment, camera/projector unit 801 projects a first video as content 804 onto the surface of product 802 based on the detected presence of user 803. When user 803 touches any of trigger areas 805 and 806, content 804 changes to a second video and a third video, respectively. For example, when camera/projector unit 801 detects the presence of user 803 on product 802, content 804 is an introduction or welcome video. When user 803 touches trigger area 805, content 804 is switched to a graphical brochure. When user 803 touches trigger area 806, content 804 is switched to a product animation. Any type of content may be employed for content 804.

Figure 9:
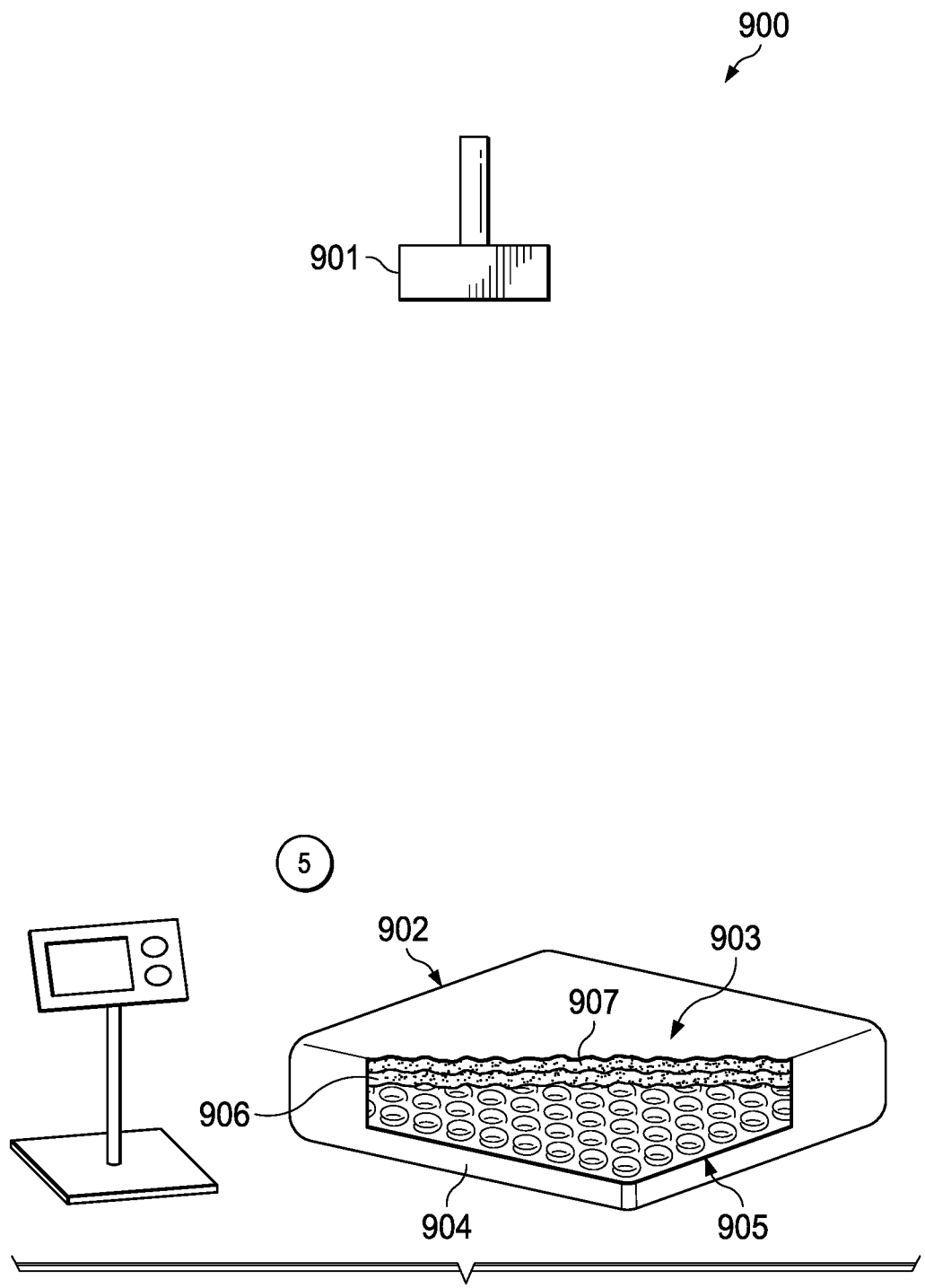
FIG. 9 is a plan view of a display of a preferred embodiment.

Referring to FIG. 9 in another embodiment, display 900 includes camera/projector 901 and product 902. In this embodiment, projected content 903 includes and sequentially displays the components of product 902 including base layer 904, support layer 905, padding layer 906 and top layer 907. In a preferred embodiment, projected content 903 includes a set of animations which represent a "pealing away" of each layer. For example, in response to a user interacting with a trigger area, top layer 907 is "pealed away" to reveal padding layer 906. Each layer in succession can be projected individually on product 902 thus enabling the user to visualize the different layers of the product. In one embodiment, projected content 903 covers the entirety of product 902. In another embodiment, projected content 903 covers a portion of product 902.

Figure 10:
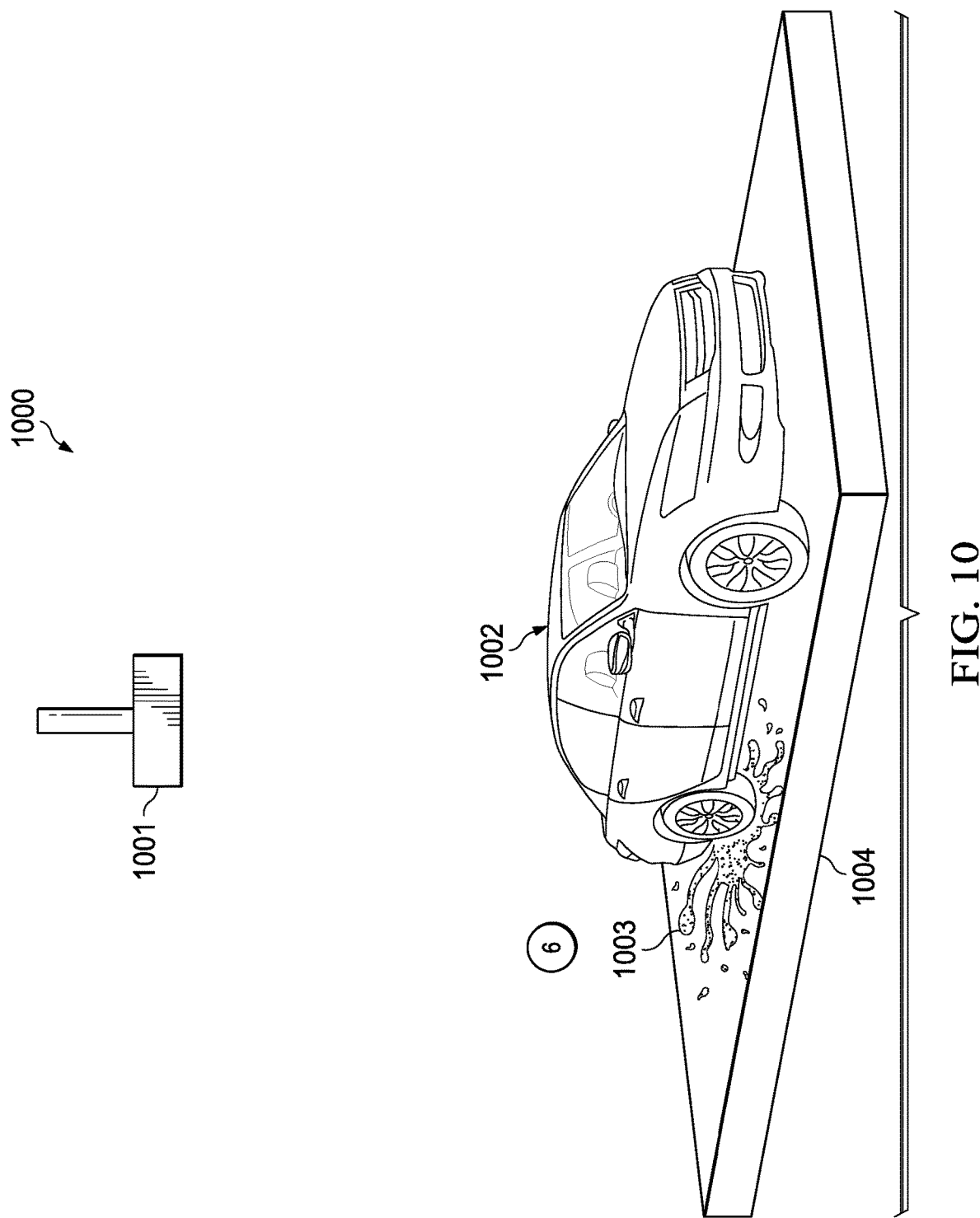
FIG. 10 is a plan view of a display of a preferred embodiment.

Referring to FIG. 10 in another embodiment, display 1000 includes camera/projector 1001 and product 1002. Product 1002 rests on floor 1004. Content 1003 is projected by camera/projector unit 1001 onto floor 1004 surrounding product 1002. Content 1003 includes animation which gives the appearance that product 1002 is driving through various environments, such as rain, snow, or mud to give the appearance that product 1002 is moving.

Figure 11:
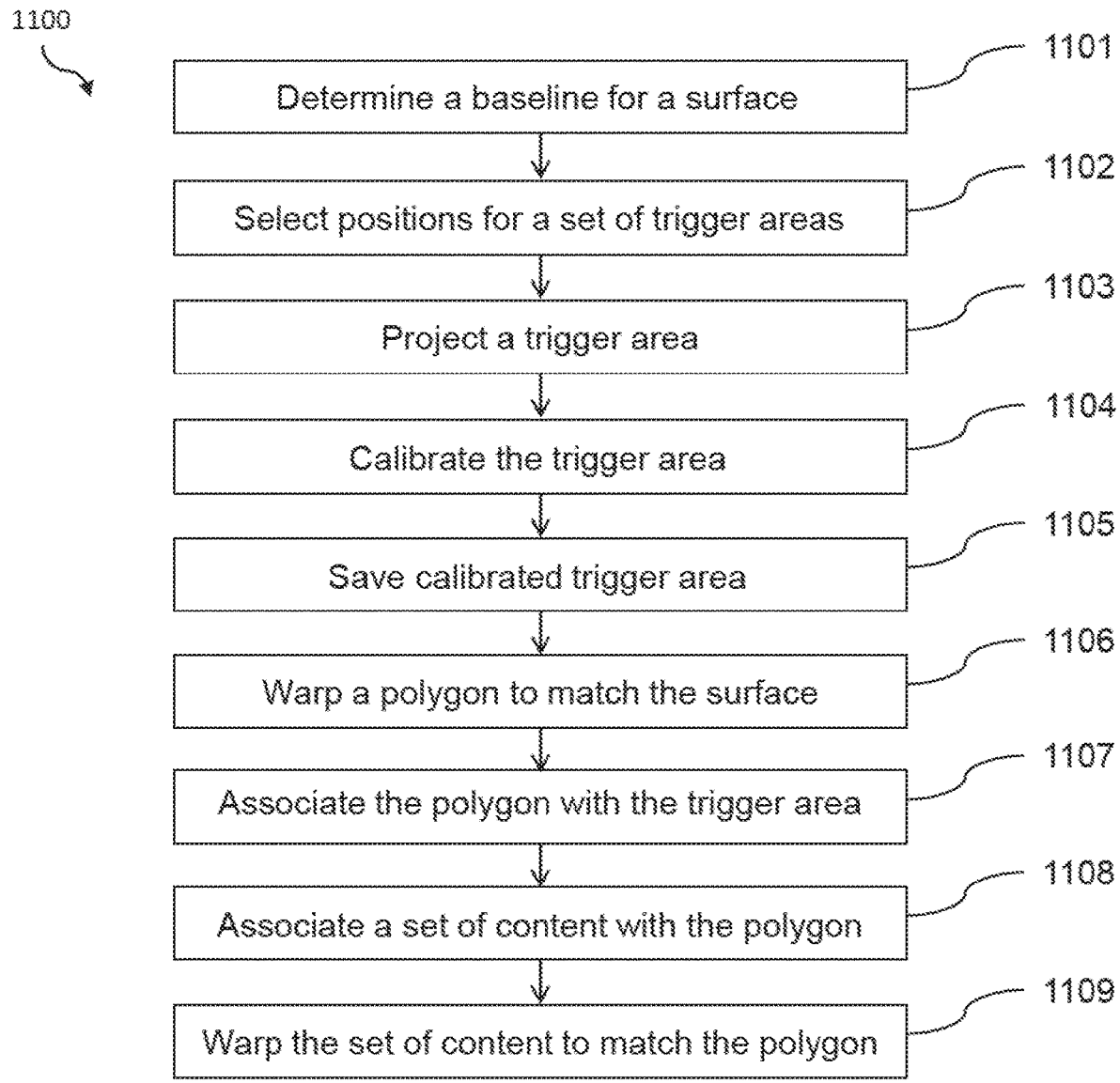
FIG. 11 is a flow chart of a calibration method of a preferred embodiment.

Referring to FIG. 11, method 1100 for calibrating camera/projector unit 200 will be described. At step 1101, a baseline image of a surface is determined. In this step, the infrared transmitter/receiver of camera 204 captures a baseline image including depth and color data of the surface of a product. In one embodiment, a thin cover, such as a sheet may be employed to cover a highly reflective surface, such as a surface of a car in order to capture an accurate baseline image.

At step 1102, a position for each of a set of trigger areas for the product is selected. In a preferred embodiment, each trigger area is an ellipse. Other shapes may be employed. At step 1103, the set of trigger areas is projected on the surface. At step 1104, each trigger area is calibrated by placing a three-dimensional object on the trigger area, such as a hemispherically shaped object. Other three-dimensional objects may be employed. In this step, a position of the three-dimensional object relative to the saved baseline image is captured with camera/projector unit 200.

At step 1105, the captured position of each three-dimensional object is saved in the memory of camera/projector unit 200. At step 1106, a polygon is warped to match the surface, thereby ensuring that the polygon conforms to the surface on which it will be projected. The polygon may correspond to the entire surface or a section of the surface.

In a preferred embodiment, a non-affine transform is employed to map a set of points of the polygon to the surface. For example, if the polygon is a square in a flat plane and the surface is an angled surface with respect to the projector, then the points of the square are mapped to a quadrilateral that distorts the square image so that when projected on the angled surface, the projected quadrilateral appears as a square on the angled surface. Other transforms, mapping, and distortion techniques may be employed.

At step 1107, the warped polygon is associated with the trigger area. At step 1108, a set of content is determined for the polygon. In this step, a file location of the desired set of content is associated with the polygon. The set of content is downloaded and saved to local memory or linked to a stream for the set of content. At step 1109, the set of content is warped to match the warped polygon so that the selection of the trigger area projects the desired content undistorted on the surface.

Figure 12:
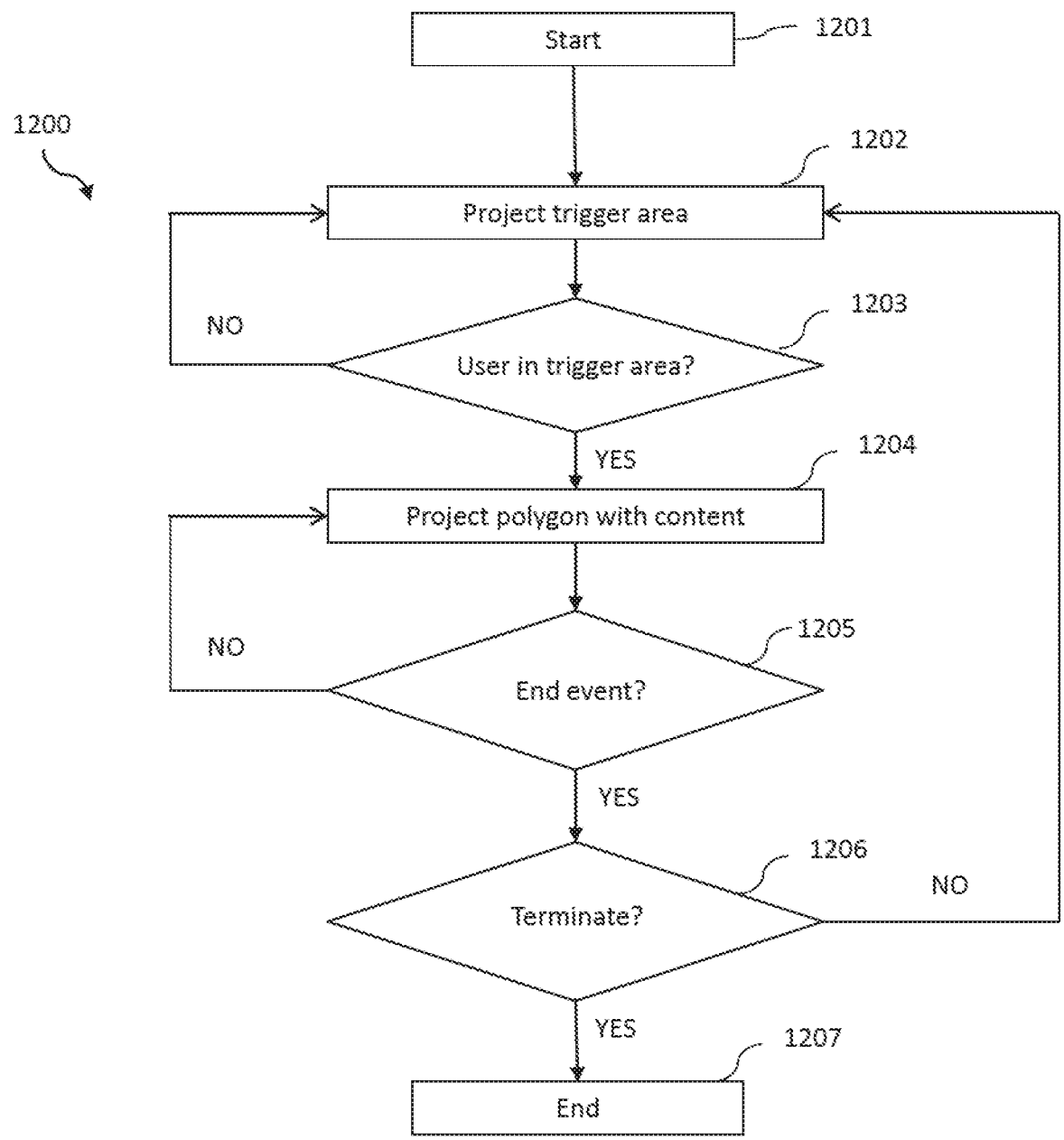
FIG. 12 is a flow chart of a run time process of a preferred embodiment.

Referring to FIG. 12 in one embodiment, runtime process 1200 will be described. At step 1201, runtime process 1200 begins. At step 1202, a set of trigger areas is projected onto a surface. At step 1203, a touch event is determined, i.e., a determination is made whether a user is in any of the set of trigger areas. In this step, the camera is queried for a user position. The user position is compared to the coordinates of a boundary for the trigger area. If the user position is not within the boundary of the trigger area, then runtime process returns to step 1202. If the user position is within the boundary of the trigger area, then runtime process proceeds to step 1204.

At step 1204, a polygon with a set of content associated with the trigger area is projected onto the surface. At step 1205, the presence of an end event is determined. An end event is a predetermined time period or another touch event by the user in the set of trigger areas. The predetermined time period is the runtime of the set of content or any desired time period. If an end event has not occurred, then runtime process 1200 returns to step 1204 to continue projecting the polygon and the set of content. If an end event has occurred, then runtime process 1200 proceeds to step 1206.

At step 1206, whether a terminate command has been received is determined. If a terminate command has not been received, then runtime process 1200 returns to step 1202. If a terminate command has been received, then runtime process 1200 ends at step 1207.

Figure 13:
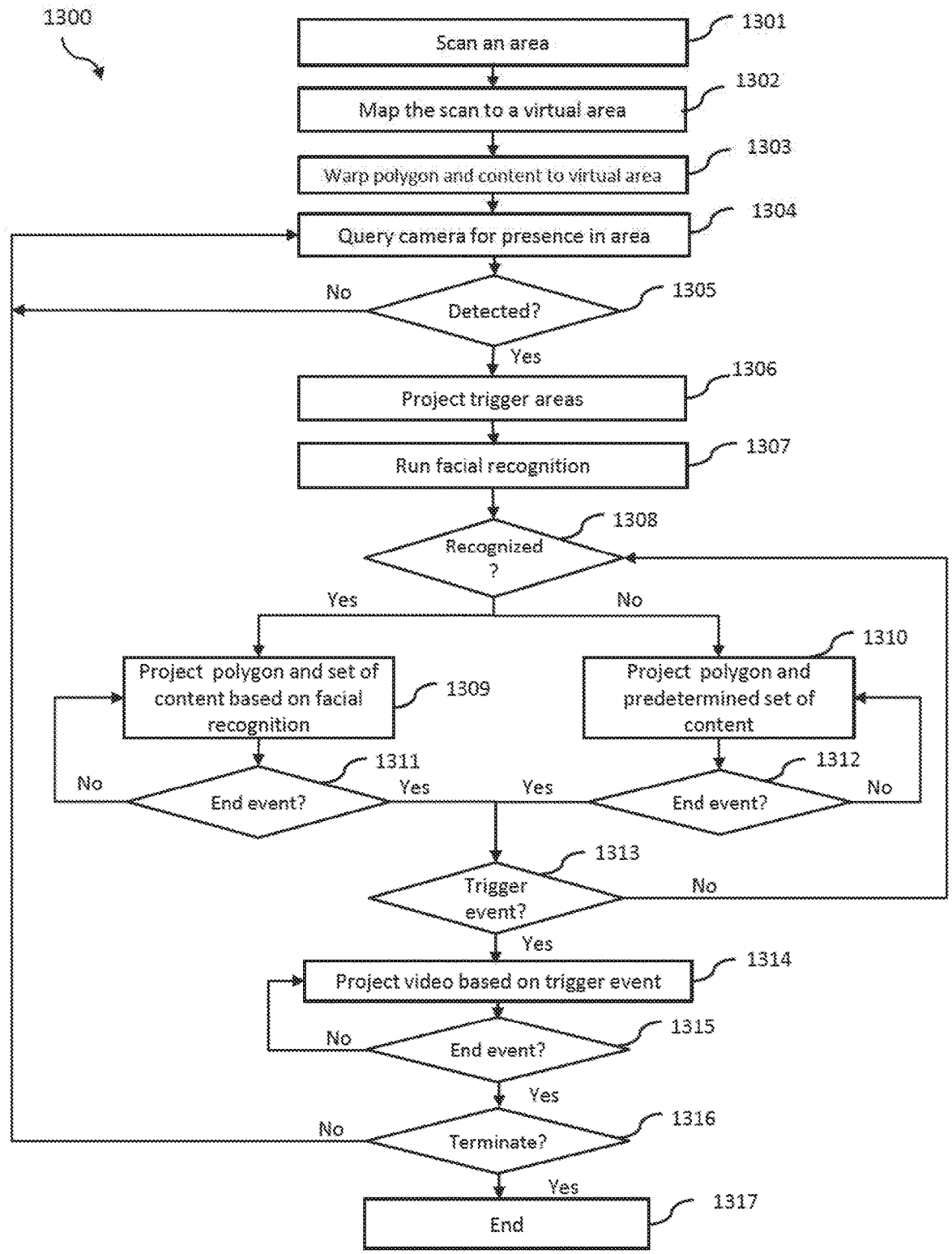
FIG. 13 is a flow chart of a run time process for projection mapping of preferred embodiment.

Referring to FIG. 13 in another embodiment, runtime process 1300 for projection mapping will be described. At step 1301, a scan of an area, such as a room is performed by a camera to detect any surfaces. At step 1302, the scan of a detected surface is mapped to a virtual area. At step 1303, a polygon and a set of content is warped to match the virtual area.

In a preferred embodiment, a non-affine transform is employed to map a set of points of the polygon and the set of content to the surface. In other embodiments, other transforms, mapping, and distortion techniques may be employed.

At step 1304, the camera is queried to determine a presence of a user in the area. At step 1305, if a presence is not detected, then runtime process 1300 returns to step 1304. If a presence is detected, then a set of trigger areas are projected onto the surface at step 1306. At step 1307, a facial recognition process begins to recognize an identity of the user, as will be further described below.

At step 1308, if the identity of the user is recognized then runtime process 1300 proceeds to step 1309. At step 1309, the polygon and a set of content associated with the user is projected onto the surface. At step 1311, the presence of an end event is determined. An end event is a predetermined time period or another touch event by the user in the set of trigger areas. The predetermined time period is the runtime of the content or any desired time period. If an end event has not occurred, then runtime process 1300 returns to step 1309 to continue projecting the polygon and the set of content. If an end event has occurred, then runtime process 1300 proceeds to step 1313.

If the identity of the user is not recognized in step 1308, then runtime process 1300 proceeds to step 1310. At step 1310, the polygon and a set of predetermined content is projected onto the surface.

At step 1312, the presence of an end event is determined. If an end event has not occurred, then runtime process 1300 returns to step 1310 to continue projecting the polygon and the set of predetermined content. If an end event has occurred, then runtime process 1300 proceeds to step 1313.

At step 1313, a touch event determination is made as to whether a user is in the set of trigger areas. In this step, the camera is queried for a user position. The user position is compared to the coordinates of a boundary for any of the set of trigger areas. If the position is not within the boundary of any of the set of the trigger areas, then runtime process 1300 returns proceeds to step 1308. If the position is within the boundary of any of the set of trigger areas, then runtime process proceeds to step 1314.

At step 1314, a polygon with a set of content associated with the trigger area is projected onto the surface. At step 1315, the presence of an end event is determined. If an end event has not occurred, then runtime process 1300 returns to step 1314 to continue projecting the polygon and the set of content. If an end event has occurred, then runtime process 1300 proceeds to step 1316.

At step 1316, whether a terminate command has been received is determined. If a terminate command has not been received, then runtime process 1300 returns to step 1304. If a terminate command has been received, then runtime process 1300 ends at step 1317.

Figure 14:
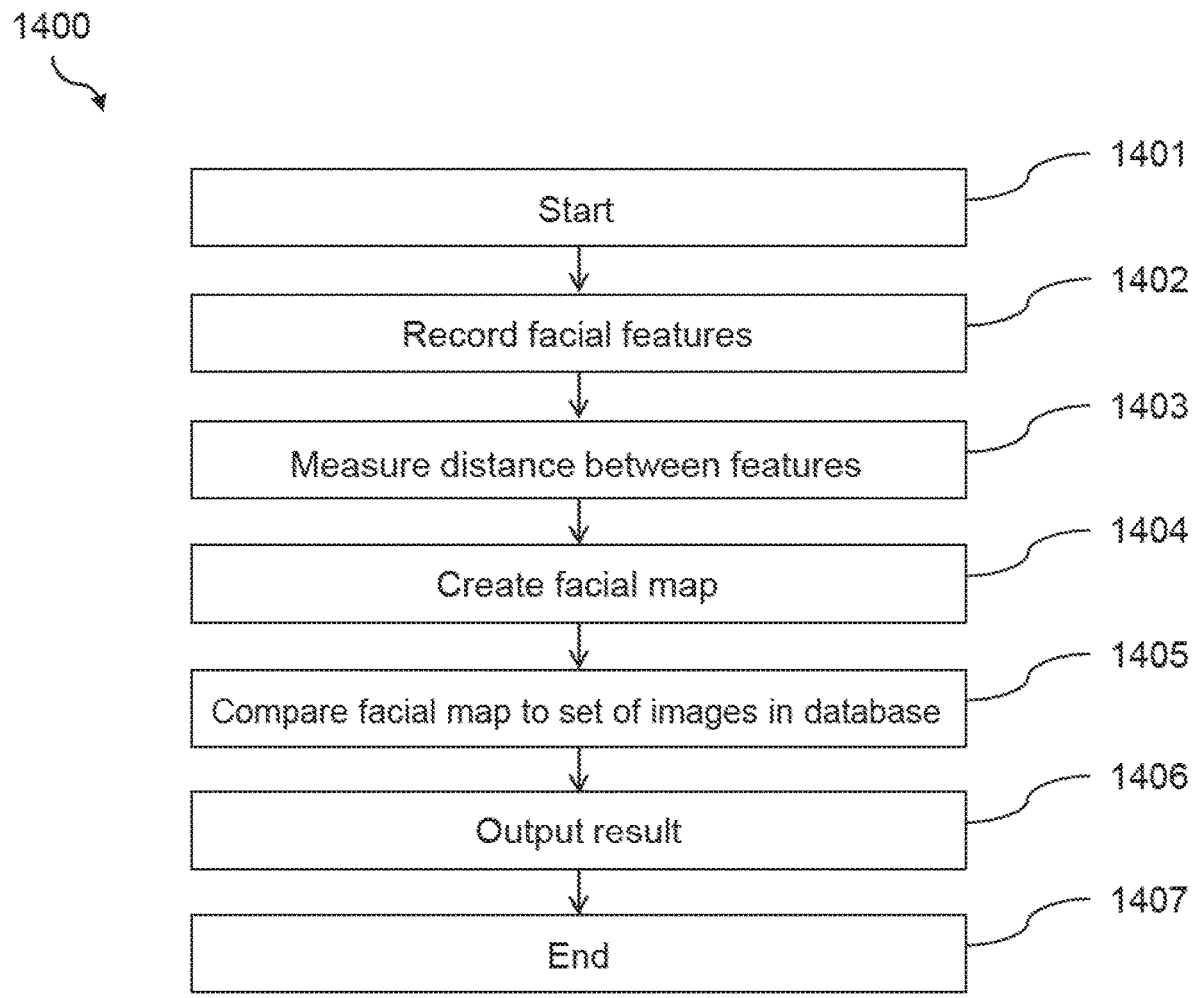
FIG. 14 is a flow chart of a facial recognition process of a preferred embodiment.

Referring to FIG. 14, step 1307 will be further described as facial recognition process 1400. Facial recognition process begins at step 1401. At step 1402, a camera is queried to record the locations of facial features including eye location and color, ear location, chin location and hair color. In a preferred embodiment, the query is accommodated by Microsoft SKD Rel. 7.1.LIB file Microsoft.Kinect.Toolkit.FaceTracking. Any type of facial tracking may be employed. In a preferred embodiment, at least 121 different locations are determined. At step 1403, the distances between facial features are measured. At step 1404, a "facial map" is created. The facial map includes a table of the facial features and the distances between them. At step 1405, the facial map is compared to a set of digital images stored in memory. A result of the comparison is output at step 1406. At step 1407, the process ends.

Figure 15:
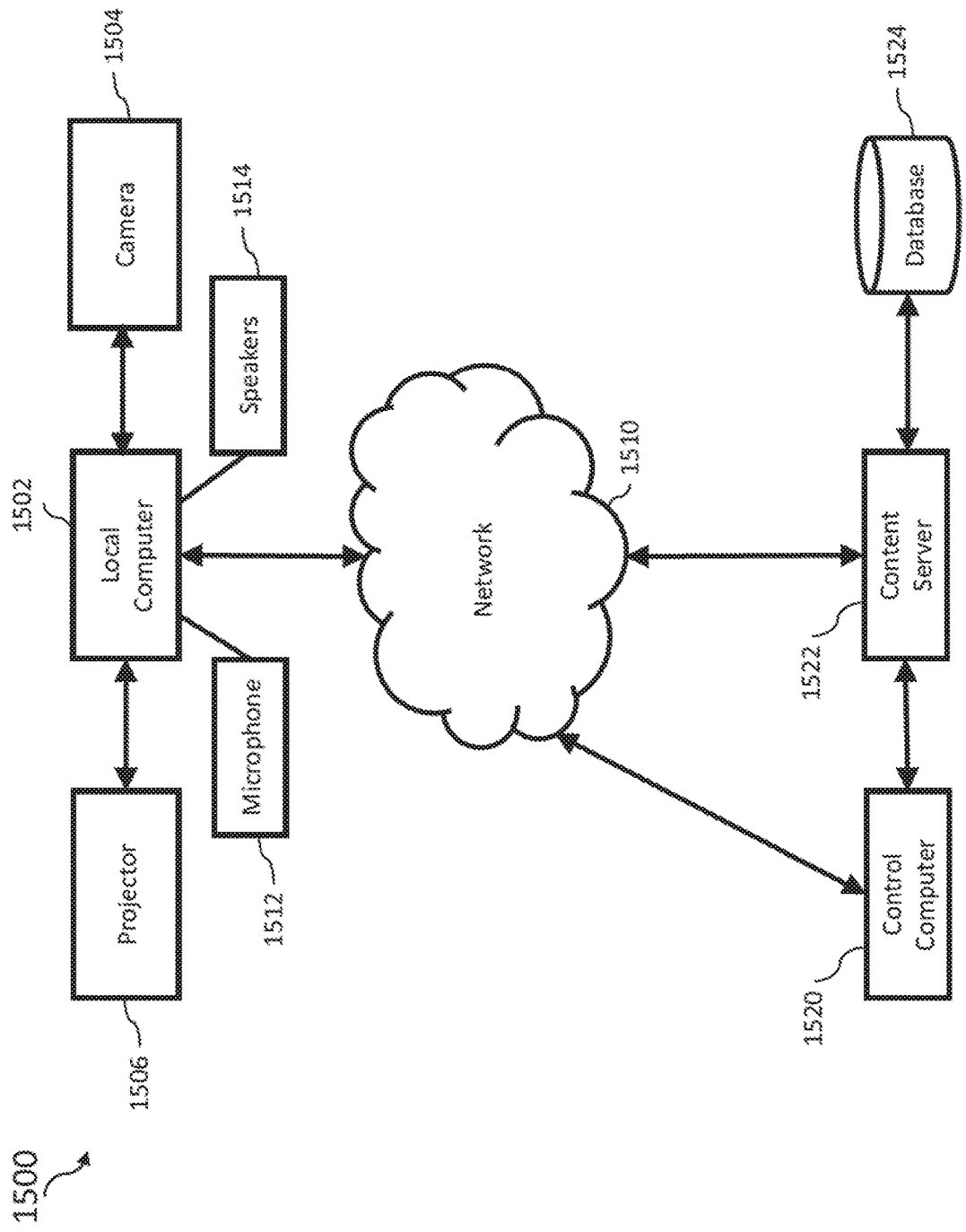
FIG. 15 is a system architecture diagram of a preferred embodiment.

Referring to FIG. 15, in one embodiment, components of interactive projection system 1500 are local computer 1502, camera 1504, and projector 1506. Local computer 1502, camera 1504, and projector 1506 can be separate components positioned individually or all be contained in a single housing. Camera 1504 collects color and depth data within its field of view, constantly monitoring defined trigger areas for interaction. Projector 1506 displays projectable content and trigger areas on any surface within its field of view. Local computer 1502 stores and manipulates camera data, content files, locations of projected content, and locations of trigger areas and projected trigger areas. Local computer 1502 analyzes camera data to determine if interaction with any trigger areas has occurred as will be further described. Local computer 1502 includes a transform function capable of warping content images in order to project the content on three-dimensional surfaces undistorted as will be further described.

In a preferred embodiment, local computer 1502 contains a processor; a memory for storage of content, a database, and any other relevant data; and a software module including hardware drivers. Minimum requirements for local computer 1502 include an Intel Core 17 processor, at least eight (8) GB of RAM, at least five (5) GB of local memory, a 2 GB graphics processor, Windows operating system 8.1 or higher, and a USB3 connection to camera 1504. An example of a suitable computer is the Latitude E6540 laptop computer available from Dell. In a preferred embodiment, hardware drivers include an image capturing program such as Kinect for Windows available from Microsoft.

Local computer 1502 is connected to camera 1504. Camera 1504 is a 3-D range camera. Camera 1504 includes firmware for movement interpretation and image recognition. Camera 1504 provides image color data in the form of streaming video at the rate of 30 frames per second in a standard 640×480 VGA format at 4 bytes/pixel. The focal length of camera 1504 is 525 pixels with a field of view that can range between approximately 45° to 75°. Camera 1504 also provides distance to target information from an on-board infrared transmitter/receiver pair. The focal length of the infrared transmitter/receiver is 580 pixels with a field of view in the range of approximately 45° to 75°. The infrared data is provided as a 16 bit number at a refresh rate of 200 µs. An example of a suitable camera is the Kinect camera available from Microsoft.

Local computer 1502 is connected to projector 1506 through an HDMI port and cable. Projector 1506 is a PC ready projector having a brightness of 10,000 lumens and a resolution of 1920×1200 WUXGA. Projector 1506 has a throw distance in the range of 4 feet to 40 feet with a standard lens. Alternate lenses are available which can dramatically increase the throw distance of projector 1506. Projector 1506 has a field of view angle in the range of 45° to 75° but can be adjusted with different lenses. An example of a suitable projector is the PLWU8100F available from ViviBright.

Local computer 1502 is connected to microphone 1512 and speaker 1514. Microphone 1512 allow for the reception of audible commands that can be used to trigger the display or playback of images, video, and audio with respect to one or more content areas. Speaker 1514 allows for the playback of the audio channels associated with a video and for the playback of audio files that have been associated with a trigger area.

In an alternate embodiment, components of interactive projection system 1500 further include network 1510, content server 1522, database 1524, and control computer 1520. Content server 1522 is connected to network 1510. Network 1510 connects local computer 1502 to content server 1522. Content server 1522 is further connected to database 1524 for the storage of multimedia and other relevant data. Network 1510 is a wide area network such as the Internet but can include other wide area or intranet networks. Local computer 1502 can download content stored in database 1524 from content server 1522 and save the content to local memory for later projection. Local computer 1502 can also stream content stored in database 1524 from content server 1522 for projection with projector 1506.

Control computer 1520 is connected to content server 1522 and connected to local computer 1502 through network 1510. Through control computer 1520, a user can manipulate local computer 1502 and set up interactive projection system 1500 from a remote location. Minimum requirements for control computer 1520 include an Intel Core 17 processor, at least eight (8) GB of RAM, at least five (5) GB of local memory, a 2 GB graphics processor, and Windows operating system 8.1 or higher.

Figure 16A:
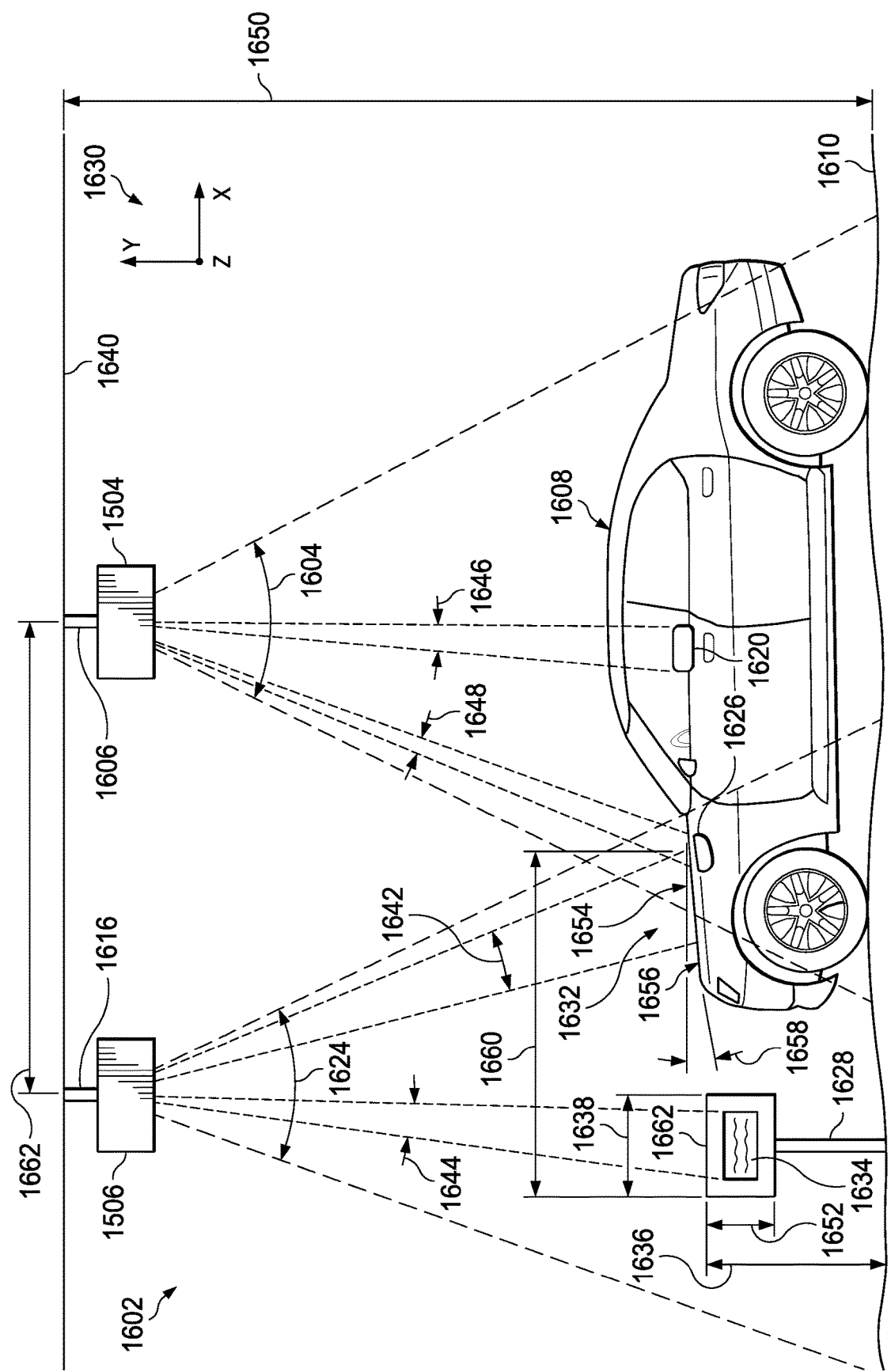
FIG. 16A is an elevation view of a preferred embodiment.

Referring to FIG. 16A and coordinate system 1630, the X axis represents horizontal, the Y axis represents vertical, and the Z axis is out of the page. The relative positions of the components within a viewing space 1602 are shown. Viewing space 1602 is a room having a light level sufficient for the projection of projector 1506 to be adequately viewed by a user. The dimensions of viewing space 1602 are those of a typical showroom floor but can vary greatly dependent on the size of the object of the interactive display and the lens of the projector. In general, camera 1504 is positioned to achieve field of view 1604. Field of view 1604 can range from 45°-75°. Camera 1504 is suspended from ceiling 1640 with arm 1606 but can also be attached to a floor stand with equal success. Object 1608 is positioned on floor 1610 within field of view 1604. The locations of any trigger areas must be within field of view 1604.

In general, projector 1506 is positioned to achieve field of view 1624. Field of view 1624 can range from 45°-75°. Projector 1506 may be suspended from ceiling 1640 with arm 1616 but can also extend from a floor stand. Object 1608 is positioned on floor 1610 within field of view 1624. The location of any projected content must be within field of view 1604. Projector 1506 and camera 1504 are separated by a distance 1662 along the X axis and by distance 1664 along the Y axis.

Placard 1622 extends from floor 1610 via stand 1628. As shown, content may be displayed on placard 1622 because placard 1622 is positioned within field of view 1624 of projector 1506. In another embodiment, placard 1622 is positioned within field of view 1604 of camera 1504. In another embodiment, placard 1622 is in field of view 1624 of projector 1506 and field of view 1604 of camera 1504 and can display both content areas and trigger areas. In a preferred embodiment, the total height 1636 of the stand and placard is about 3 to 4 feet, the length 1638 of the placard is about 16 inches, and the width 1652 of the placard is about 12 inches. Distance 1650 is the distance between ceiling 1640 and floor 1610 and is about 16 feet in one preferred embodiment.

Field of view 1624 of projector 1506 is about 72 degrees and includes field of view 1642 and field of view 1644. Field of view 1642 is the field of view for content area 1632 on the surface of object 1608 and is about 7 degrees. Field of view 1644 is the field of view for content area 1634 on placard 1622 and is about 5 degrees. Placard 1622 and object 1608 are within distance 1660 of about 8 feet of each other so that the images projected onto placard 1622 and onto the object are within field of view 1624 of projector 1506.

Field of view 1604 of camera 1504 includes field of view 1646 and field of view 1648. Field of view 1646 is the field of view for trigger area 1620 on the surface of object 1608 and is about 4 degrees. Field of view 1648 is the field of view for trigger area 1626 on the surface of object 1608 and is about 3 degrees. Field of view 1604 of camera 1504 is different from field of view 1624 of projector 1506 so that camera 1504 may monitor trigger areas that are outside of field of view 1624 of projector 1506.

Figure 16B:
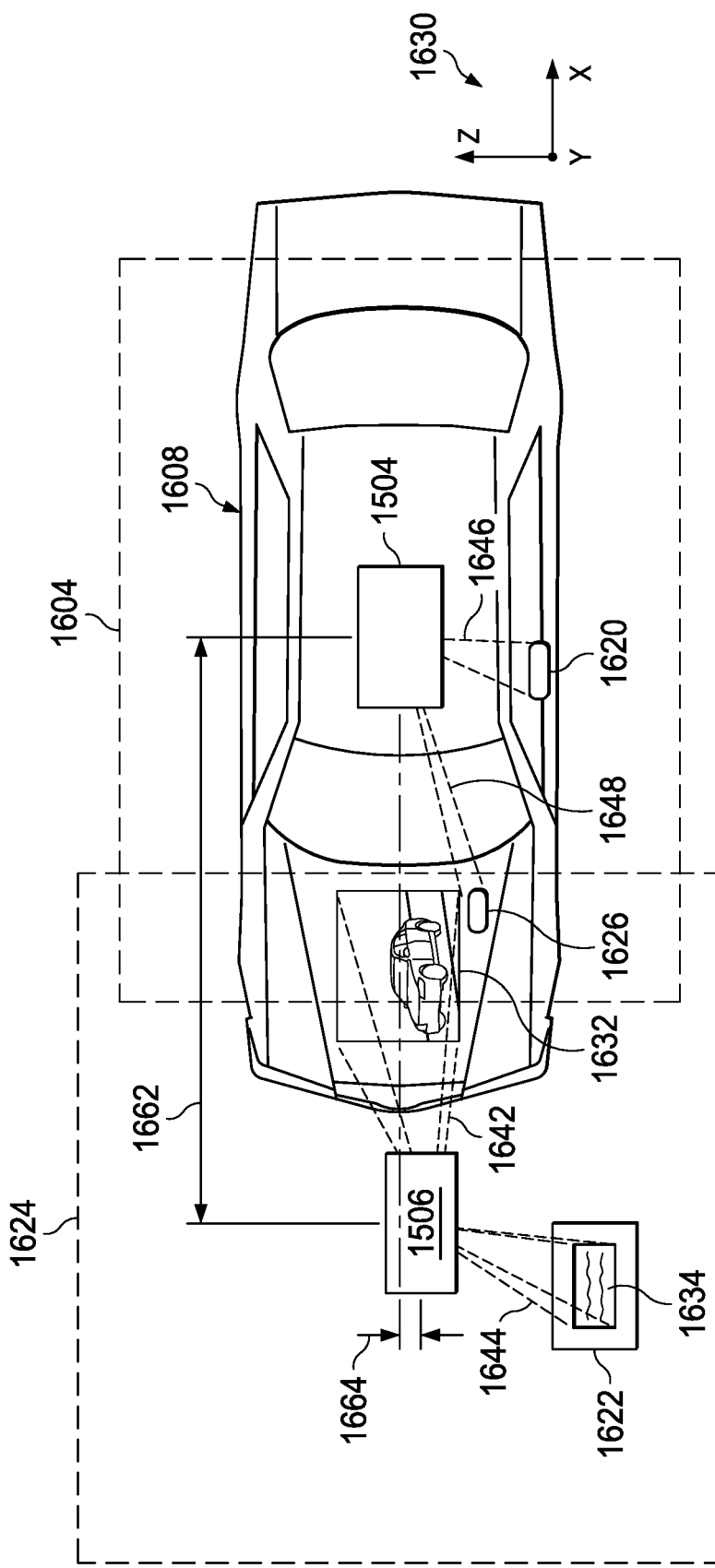
FIG. 16B is an elevation view of a preferred embodiment.

Referring to FIG. 16B, camera 1504 is positioned generally over object 1608. The position of camera 1504 on the X axis and Z axis is dictated by the desired positions of trigger areas. In one embodiment, camera 1504 is positioned within a range of 5 to 16 feet along the Y axis above object 1608 and within a range of 10 to 20 feet of floor 1610. Trigger areas shown within the field of view of the camera. Trigger area 1620 is positioned on object 1608. Trigger area 1626 is positioned on the surface of object 1608. The system may project an indicator of trigger area 1626 on the surface of object 1608

The position of projector 1506 on the X and Z axes is dictated by the desired positions of content areas 1632 and 1634. In one embodiment, projector 1506 is positioned within a range of 4 to 40 feet along the Y axis above any surface in which content is desired to be displayed. The ideal distance being dictated by the lens. The surface on which the system displays content should be within the field of view of the projector. In one embodiment, content area 1632 is positioned on the hood portion of object 1608, which in this case is a car. Content area 1634 is positioned on placard 1622.

Figure 16C:
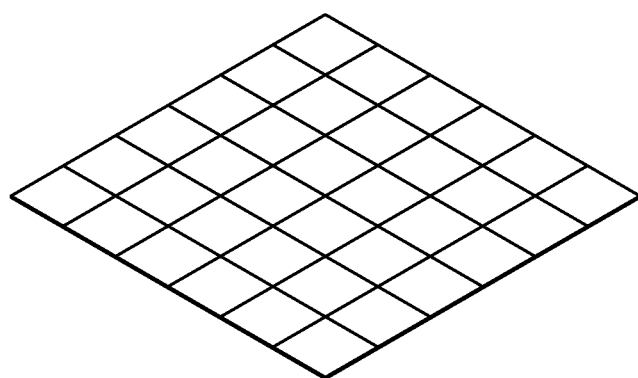
FIG. 16C is a hypothetical flat surface of a preferred embodiment.

Flat surface 1654, shown in FIG. 16C, is a hypothetical surface to be targeted at object 1608. Object 1608 includes curved surface 1656, onto which content area 1632 is projected. Angle 1658 is the difference between flat surface 1654 and curved surface 1656.

The trigger areas are distinct from the content areas but may be linked with each other. In an alternative embodiment where a trigger area is on the headlight of a car, the associated content area may be on the hood of the car so that when the trigger area on the headlight is touched, a video is played on the content area on the hood and the audio associated with the video is played via one or more speakers. Furthermore, instead of a video being played on the hood, the trigger area on the headlight may be linked to an audio recording so that when the trigger area on the headlight is touched, the audio recording (also known as an audio response) is played.

In additional embodiments, a computer monitoring the trigger areas is also in communication with the car and can control the functions of the car in response to interaction with the trigger areas. This allows for control of the object— the car—in concert with media displayed or projected onto the object. In one embodiment, interaction with a trigger area on the hood of a car causes a video of the engine to be played on the hood and causes the system to start up the engine of the car. When the object is a car, additional features can be controlled in response to interaction with trigger areas, such as: turning on or off headlights and taillights, locking and unlocking doors, opening and closing windows, opening the trunk, and the like.

Referring to FIG. 16C, surface 1654 is a hypothetical flat surface above object 1608 through which an image from the projected passes. The plane of surface 1654 is perpendicular to the direction that the projector is pointing and is tangential to object 1608.

Figure 16D:
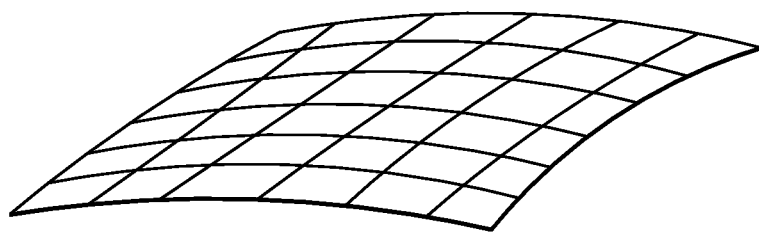
FIG. 16D is a hypothetical curved surface of a preferred embodiment.

Referring to FIG. 16D, surface 1656 is the surface of object 1608, which is curved and not flat. Images projected onto curved surfaces, such as surface 1656, instead of onto flat surfaces, such as hypothetical surface 1654, are adjusted by warping and transforming the image to match the curvature of the surface.

Figure 17:
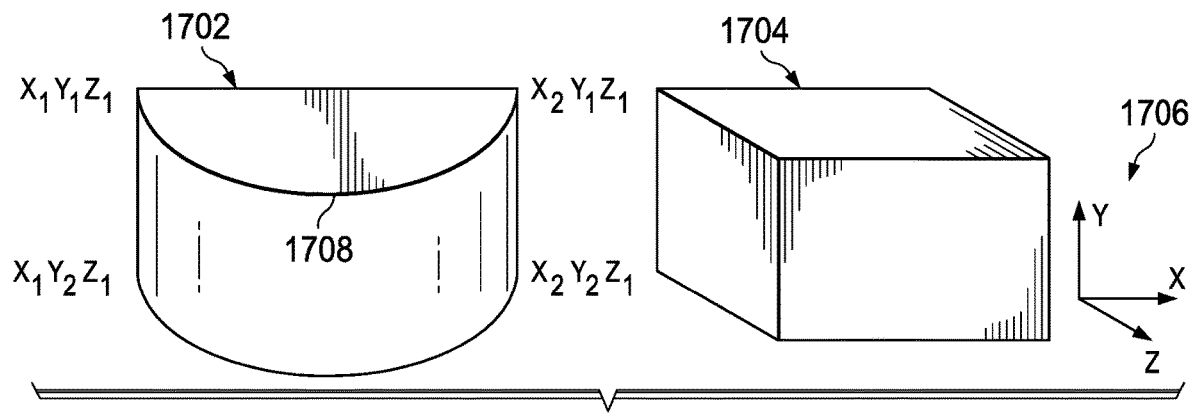
FIG. 17 is an isometric view of trigger areas of a preferred embodiment.

Referring to FIG. 17A, trigger area is described. Trigger areas 1702 and 1704 are predefined 3-dimensional spaces stored in the database. Trigger areas are monitored by the infrared sensors in camera 1504 for interaction with the system by a user. When the infrared sensors detect a user in a trigger area, a predefined action, such as displaying stored content, is carried out by the system.

A trigger area can be any three-dimensional shape bounded by a series of points which form lines that enclose a volume. Referring to coordinate system 1706, trigger area 1702 is bounded by a set of points including X1, Y1, Z1; X2, Y1, Z1; X1, Y2, Z1; X2, Y2, Z1; and function 1708. Function 1708, in this example, is a hyperbolic function defined by the equation $$Cx^2+y^2 \qquad \text{Eq. 12}$$

Other hyperbolic functions or linear functions may be used to define any set of points, in the X, Y, or Z directions, defining a general shape, so long as the function is closed with respect to the discrete area. Trigger area 1704 is a three-dimensional polygon. The various X, Y, and Z values for each trigger area can vary. The X and Y values range between 2 and 12 inches, preferably around 7 to 8 inches. The Z value can range between 1 and 4 inches, preferably about 2 inches.

FIG. 18A is a diagram of a set of data elements stored in the computer and accessed by a trigger area software program, such as touchable area application 1802, in accordance with one embodiment. Touchable area application 1802 is an application running on a computer system that allows for the display of projected content onto objects and surfaces based user interaction with trigger areas that have been associated with and linked to the projected content. Touchable area application 1802 includes tabs 1804, 1806, and 1808; one or more content controls 1852; and one or more trigger controls 1854.

Figure 19C:
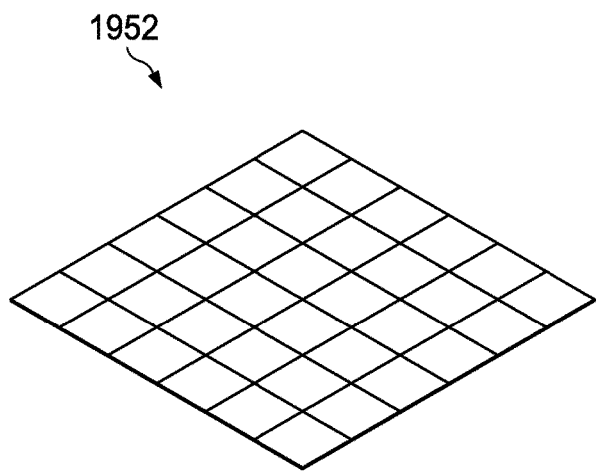
FIG. 19C is a view of an area of a trigger area in accordance with one embodiment of the disclosure.
Figure 19D:
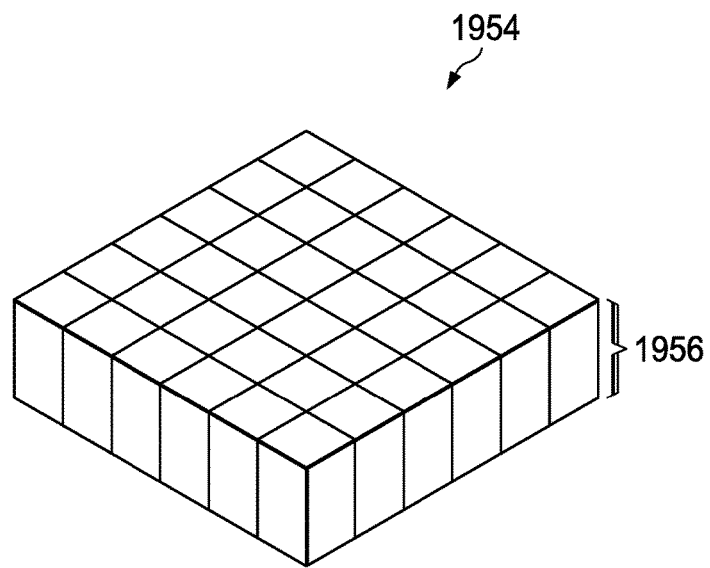
FIG. 19D is a view of a volume of a trigger area in accordance with one embodiment of the disclosure.
Figure 19A:
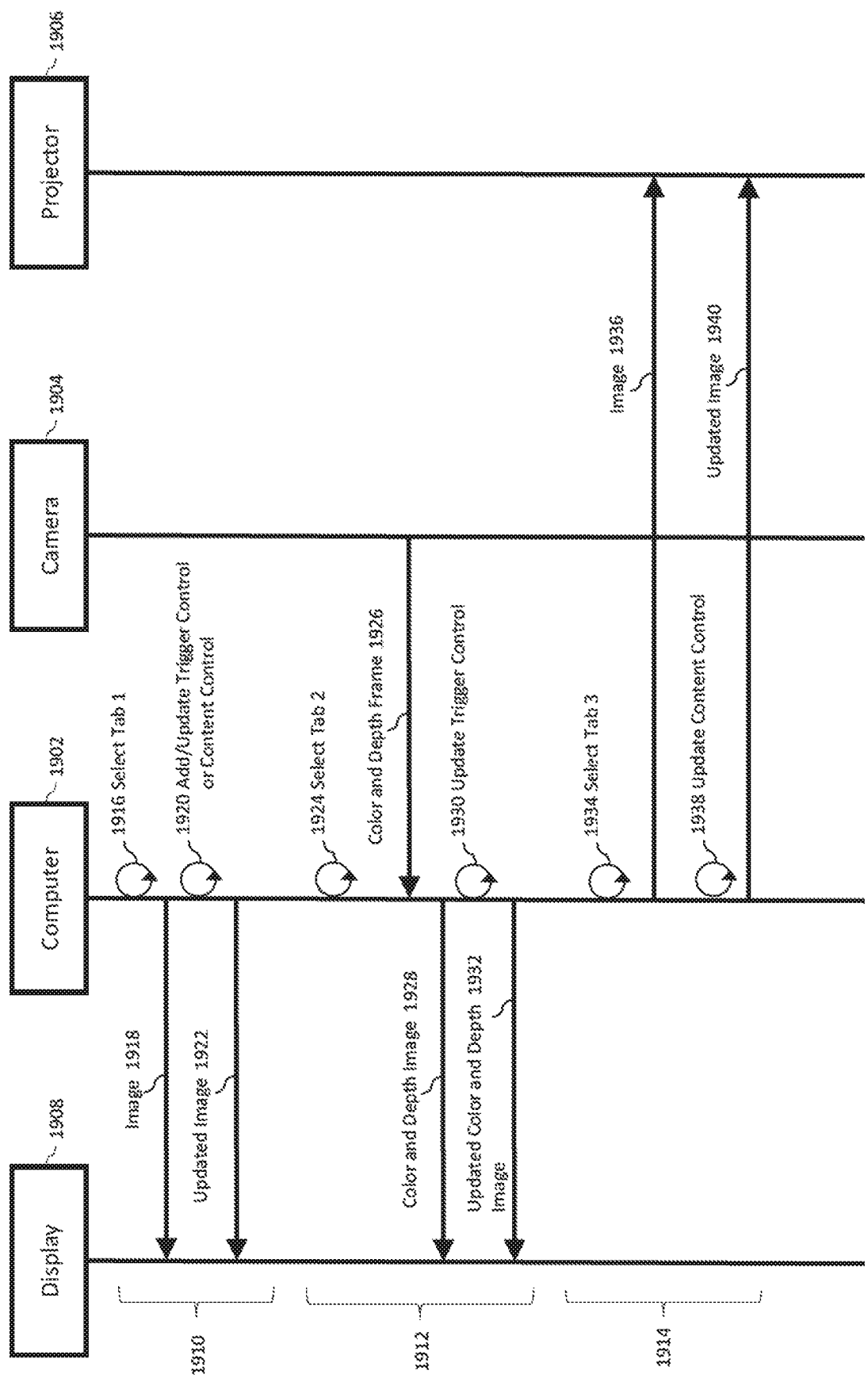
FIG. 19A is a data flow diagram of a system using trigger areas in accordance with one embodiment of the disclosure.

Tabs 1804, 1806, and 1808 are user interface elements displayed in the application window of touchable area application 1802 that allow for the selection between different modes of the application, such as modes 1910, 1912, and 1914 shown in FIG. 19A. Tabs 1804, 1806, and 1808 are displayed in display area 1816.

Display area 1816 is the display space of touchable area application 1802. Touchable Area Application includes trigger controls 1854 and content controls 1852 that are displayed in display area 1816.

Trigger controls 1854 are each associated with an instance of trigger area data structure 1818. Trigger area data structure 1818 include several fields of data to identify a trigger area that is monitored by a camera with the computer, such as camera 1504 and computer 1502 of FIG. 15.

Content controls 1852 are each associated with an instance of content data structure 1820. Content data structure 1820 identifies the content and the content area in which the content is displayed by the system. Content data structure 1820 includes several data fields to identify the content and control its display.

FIG. 18B is a diagram of a trigger area data structure in accordance with one embodiment of the disclosure. Trigger area data structure 1818 is associated with trigger control 1854 and includes coordinates 1822, type 1824, name 1826, identifier 1828, depth data 1830, content data structure 1820, and filename 1834. The data associated with trigger area data structure 1818 is stored to one or more files that allows trigger data structure area 1818 to be saved and reloaded by touchable area application 1802.

Coordinates 1822 identify x and y locations for each of four corners for where trigger control 1852 is displayed in display area 1816.

Type 1824 identifies a type of content associated directly with trigger area data structure 1818, such as an image or video.

Name 1826 is a user friendly name that identifies an instance of a trigger control.

Identifier 1828 is a unique identifier, such as a globally unique identifier (GUID), which is given to each trigger control 1854 of touchable area application 1802 to access trigger control 1854.

Depth data 1830 identifies the three-dimensional location or touch box associated with trigger area data structure 1818 and trigger control 1854.

Content data structure 1820 identifies the content area that is associated with trigger area data structure 1818 and trigger control 1854.

Filename 1834 identifies a file, such as an image file, that provides a default image for trigger control 1854. Filename 1834 may point to a fully transparent image so that, by default, no image is displayed by trigger control 1854.

FIG. 18C is a diagram of a content data structure in accordance with one preferred embodiment. Content data structure 1820 is associated with content control 1852 and includes several data fields to identify and display content within display area 1816 of touchable area application 1802.

Coordinates 1836 identify x and y locations for each of the corners of content control 1852. The corners identified by coordinates 1836 form a polygon. When the image or video associated with content data structure 1820 is displayed, the corners of the image or video are warped and transformed to fit the shape identified by coordinates 1836.

Type 1838 identifies the type of content associated with content data structure 1820 and content control 1852. Content types include image, video, sound, and the like.

Loop 1840 identifies how many times to loop the content when, for example, type 1838 of content area 1820 identifies that the content is a video.

Orientation 1842 identifies the orientation used to display images associated with content control 1852. In one embodiment, Orientation 1842 specifies that, when displayed, the image or video associated with content control 1852 is flipped about the horizontal or vertical axes or rotated by a multiple of 90 degrees.

Filename 1844 identifies the filename of the image or video associated with content data structure 1820 and content control 1852. In additional embodiments, filename 1844 is a link to static or dynamic content such as a video file, a streaming video file, or a live camera stream that is played in response to interaction with a trigger area.

Identifier 1846 is a unique identifier or GUID that is given to each content control 1852 of touchable area application 1802 to access content control 1852.

Name 1848 is a user friendly name that identifies an instance of a content control.

FIG. 19A is a data flow diagram of a system calibrating trigger areas and content areas in accordance with the disclosure. In this embodiment, the system includes computer 1902, camera 1904, projector 1906, and display 1908.

Computer 1902 is connected to range camera 1904 via a USB (universal serial bus) 3.0 connection and is connected to projector 1906 and display 1908 by an HDMI (high-definition multimedia interface) connection. Computer 1902 controls the images displayed by display 1908 and projector 1906. Camera 1904 provides color data and depth data. Projector 1906 projects images sent from computer 1902 onto any surface in front of projector 1906, including one or more display stands, objects, and screens. Display 1908 displays the application to aid the calibration process The touchable area application uses three modes to perform the calibration process, first mode 1910, second mode 1912, and third mode 1914. When first mode 1910 is selected, user interface controls are associated with the touchable area application. For example, in the case where a static image is displayed by default and two videos are shown based on interaction with two trigger areas, the static image, the two videos, and the two trigger controls are added to the touchable area application. In First mode 1910, the application performs steps 1916, 1918, 1920, and 1922.

In second mode 1912, the three-dimensional real world locations for trigger areas are selected. In second mode 1912, the application performs steps 1924, 1926, 1928, 1930, and 1932.

In third mode 1914, the projected locations of the projected content is selected, fine-tuned, and aligned. In third mode 1914 the application performs steps 1934, 1936, 1938, and 1940.

At step 1916, a first tab is selected in the touchable area application to set the mode of the touchable area application to first mode 1910. One example of code for selecting a first tab is shown in the computer program listing appendix in the computer program listing of the file named MainWindow.xaml.cs at lines 922-926.

At step 1918, the display image of the application is sent to display 1908 so that the user interface controls-trigger controls and content controls—can be added and manipulated.

At step 1920, trigger controls and content controls are added and updated. New trigger controls and content controls may be added and the associations between the trigger controls, trigger areas, content controls, and content areas may be updated. The corners of the content controls and trigger controls can be moved or dragged to reshape the images and video that are projected onto the content areas and trigger areas. One example of code that performs this function is shown in the computer program listing appendix in the computer program listing of the file named NonAffineTransformControl.xaml.cs at lines 437-476. This code calls a function to determine a transformation matrix, which is shown in the computer program listing appendix in the computer program listing of the file named NonAffineTransformControl.xaml.cs at lines 1220-1258. One example of code for updating trigger or content controls is shown in the computer program listing appendix in the computer program listing of the file named NonAffineTransformControl.xaml.cs at lines 478-512.

At step 1922, for each change to the user interface controls from step 1920, the image sent to display 1908 is updated. This provides feedback to allow the sequences, timing, and interaction between the trigger controls and content controls.

At step 1924, a second tab is selected to shift the application to second mode 1912 to allow for the selection of the physical locations of the trigger areas that are associated with trigger controls. One example of code for selecting a second tab is shown in the computer program listing appendix in the computer program listing of the file named MainWindow.xaml.cs at lines 927-971.

At step 1926, computer 1902 receives color and depth data from camera 1904.

At step 1928, the display area of the application window of the application is changed to show a combination of the color and depth data received from camera 1904 with the trigger controls overlaid onto the image.

At step 1930, the trigger controls that were added in first mode 1910 are associated physical locations that are monitored by camera 1904. The associations are created by dragging and moving the trigger controls displayed on display 1908. One example of code for updating trigger controls is shown in the computer program listing appendix in the computer program listing of the file named NonAffineTransformControl.xaml.cs at lines 478-512.

At step 1932, for each change to a trigger control and each change in the color and depth data received from camera 1904, computer 1902 updates the image sent to display 1908.

At step 1934, a third tab, such as third tab 1808 of FIG. 18, is selected to set the mode of the application to third mode 1914 to allow for selection of the location of the content areas that will be associated with the content controls. One example of code for selecting a third tab is shown in the computer program listing appendix in the computer program listing of the file named MainWindow.xaml.cs at lines 916-920.

At step 1936, computer 1902 stops displaying the color and depth data from camera 1904 and displays the touchable area application as a full screen window on projector 1906 including the user interface controls. Projector 1906 projects the image from computer 1902 onto the surfaces and objects in front of projector 1906. For example, when camera 1904 projects onto the hood of a car the content displayed by the touchable area application is an image of the engine. In an alternative embodiment, the image sent by computer 1902 to projector 1906 is also sent to display 1908 so that the image is displayed by both display 1908 and by projector 1906.

At step 1938, the content control is updated. For example, the sizes of the content control are adjusted to match the surfaces onto which they are being projected. When the hood of the car has a trapezoidal shape, the corners of the content control are dragged to match the trapezoidal shape of the hood. One example of code for updating content controls is shown in the computer program listing appendix in the computer program listing of the file named NonAffineTransformControl.xaml.cs at lines 478-512.

At step 1940, for each update to the content controls from step 1938, the image sent to the projector is updated to include the changes made in step 1938.

Figure 19B:
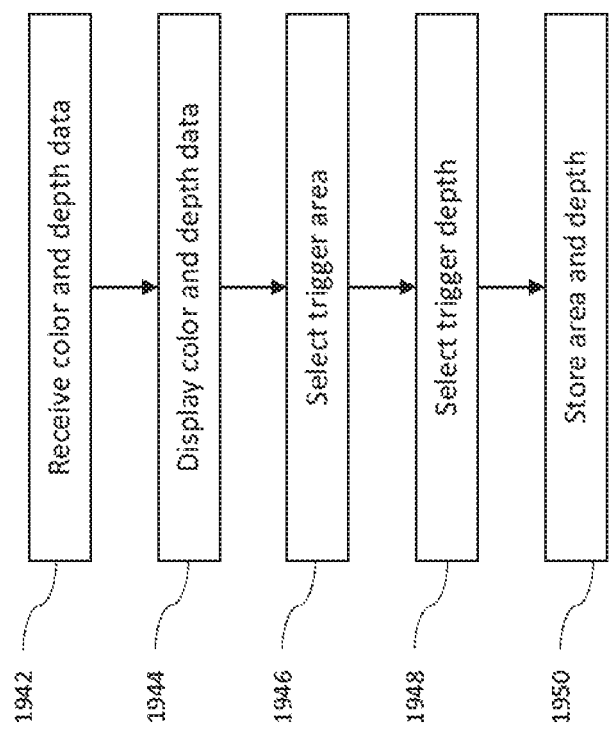
FIG. 19B is a flow chart for updating a trigger area in accordance with one embodiment of the disclosure.

FIG. 19B is a flow chart for updating a trigger area associated with a trigger control in accordance with one embodiment of the disclosure. The method for updating a trigger area of FIG. 19B is one embodiment for step 1930 of FIG. 19A.

At step 1942, color and depth data are received from a camera, such as camera 1904. The color and depth data are received as one or more byte streams that contain two frames of data, one based on the color sensor of the camera and one based on the infrared depth sensor of the camera. The resolution of the color sensor and the depth sensor differ so that the resolution of the two frames of data also differ. As one example, the color data may have a resolution of 1920 by 1080 with 32 bits of color information per pixel and the depth data may have a resolution of 640 by 480 with 16 bits of depth information per pixel.

At step 1944, a combination of the color and depth data is displayed. The color data resolution is cropped to the depth data resolution. Within the cropped resolution, color data is displayed if the depth data indicates there is a surface or object within the range of the depth sensor.

At step 1946, a trigger area associated with a trigger control is selected. The trigger area identifies the three-dimensional coordinates of a trigger area that is stored in a trigger area data structure associated with a trigger control and is with respect to the camera that provides the depth data. As shown in FIG. 19C, area 1952 is an area of a surface within the range and viewing area of the depth sensor. In a preferred embodiment, the shape of the area defaults to a square or rectangle, but any other shape can be used.

At step 1948, a depth for the trigger area is selected. The depth combined with the trigger area creates a volume that is associated with a trigger area and is used to determine if the trigger area has been touched. FIG. 19D shows volume 1954 created from area 1952 through the addition of depth 1956.

At step 1950, the trigger area and depth are stored. The trigger area and depth are associated with the trigger area and saved to the database. In a preferred embodiment, the trigger area and depth are stored in depth data 1830 of trigger area data structure 1818 of FIG. 18B.

Figure 19E:
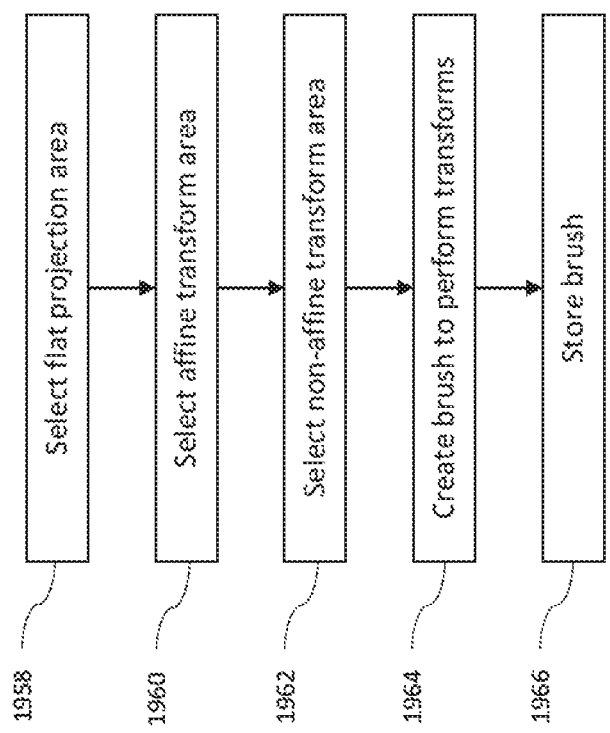
FIG. 19E is a flow chart for updating content in accordance with one embodiment of the disclosure.

FIG. 19E is a flow chart for updating a content area in accordance with one embodiment of the disclosure. The method for updating a content area of FIG. 19E is one embodiment for step 1938 of FIG. 19A.

Figure 19F:
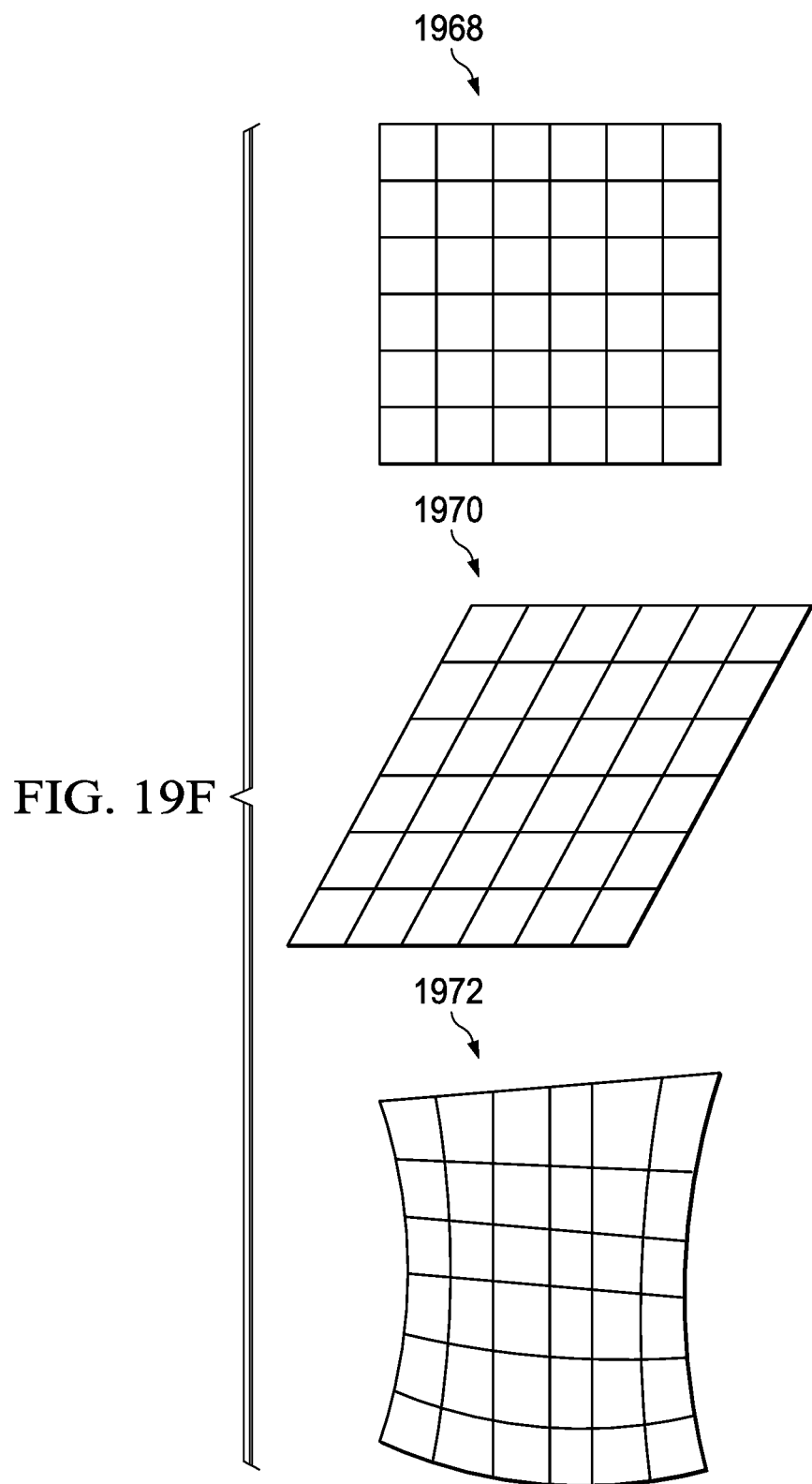
FIG. 19F shows the matrix transformations applied to content in accordance with one embodiment of the disclosure.

At step 1958, an initial flat projection area is selected. The native resolution of the content that is selected and associated with a content control provides the initial flat projection area. FIG. 19F shows initial flat projection 1968 of content that has been selected.

At step 1960, an area related to an affine transformation is selected. In a preferred embodiment, the area for the affine transformation is selected by dragging the corners the content area into a desired shape. As an example, when the content area is a rectangular image, one or more of the corners are dragged to form a scaled parallelogram shape, as shown by transformation 1970 of FIG. 19F.

At step 1962, an area related to a non-affine transformation is selected. In a preferred embodiment, the area is selected by dragging one or more of the corners and lines that from the boundary of the content area into curved shapes, as shown by transformation 1972 of FIG. 19F.

At step 1964, a brush or filter is created from the affine transformation and the non-affine transformation. The brush will be applied to the content associated with the content control to transform the original size and shape of the content to the selected size and shape of the area selected via steps 1960 and 1962 that correspond to an affine transformation and a non-affine transformation. When the content is a video, the brush is applied to each frame of the video as the video is displayed.

At step 1966, the brush created from the selected areas for the affine transformation and the non-affine transformation are saved to persistent storage FIG. 19F shows the matrix transformations applied to content in accordance with one embodiment of the disclosure. Flat projection 1968 is an initial projection that has not been warped and transformed. Projection 1970 has been warped and transformed using an affine transformation. Projection 1972 has been warped and transformed using a non-affine transformation.

The following code listing provides an example of calculating a transformation:

```
//The input array of points describes a 2D rectangle
// (with Z assumed to be zero) in the order
// lower-left, upper-left, lower-right, upper-right.
//The returned transform maps the points (0, 0, 0),
//(0, 1, 0), (1, 0, 0), and (1, 1, 0) to these points.
private Matrix3D CalculateNonAffineTransform(Point3D[ ] points)
{
// Affine transform
//----------------
// This matrix maps (0, 0) --> (x0, y0)
//    (0, 1) --> (xl, yl)
//    (1, 0) --> (x2, y2)
//    (1, 1) --> (x2 + xl + x0, y2 + yl + y0)
Matrix3D A= new Matrix3D( );
A.M11 = points[2].X – points[0].X;
A.Ml2 = points[2].Y – points[0].Y;
A.M21 = points[l].X – points[0].X;
A.M22 = points[l].Y – points[0].Y;
A.OffsetX = points[0].X;
A.OffsetY = points[0].Y;
// Calculate point (a, b) that get mapped by the affine
// transform to (x3, y3)
double den= A.M11 * A.M22 – A.Ml2 * A.M21;
double a= (A.M22 * points[3].X – A.M21 * points[3].Y +
    A.M21 * A.OffsetY – A.M22 * A.OffsetX) / den;
double b = (A.M11 * points[3].Y – A.M12 * points[3].X +
    A.Ml2 * A.OffsetX – A.M11 * A.OffsetY) / den;
//Non-affine transform
//--------------------
// This matrix maps (0, 0) --> (0, 0)
//    (0, 1) --> (0, 1)
//    (1, 0) --> (1, 0)
//    (1, 1) --> (a, b)
Matrix3D B = new Matrix3D( );
B.M11 = a / (a + b – 1);
B.M22 = b / (a + b – 1);
B.Ml4 = B.M11 – 1;
B.M24 = B.M22 – 1;
return B * A;
}
```

Figure 20A:
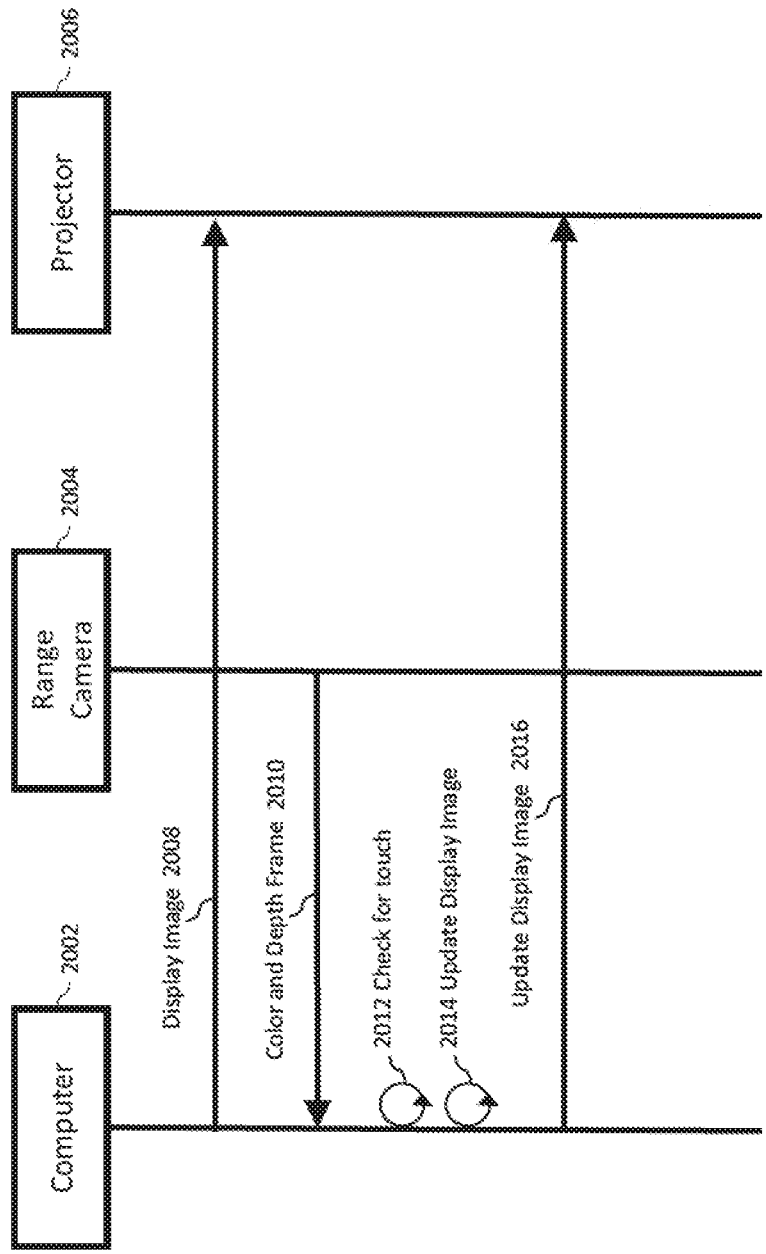
FIG. 20A is a data flow diagram of a system using trigger areas in accordance with one embodiment of the disclosure.

FIG. 20A is a data flow diagram of a system using trigger areas in accordance with the disclosure. The system includes computer 2002, range camera 2004, and projector 2006 and has already been calibrated to align the trigger areas and content areas to the surfaces and objects in front of projector 2006.

Computer 2002 is connected to range camera 2004 via a USB (universal serial bus) 3.0 connection and is connected to projector 2006 by an HDMI (high-definition multimedia interface) connection. Computer 2002 controls the image displayed by projector 2006 based on data received from range camera 2004. Range camera 2004 provides color data and depth data. Projector 2006 projects images sent from computer 2002 onto any surface in front of projector 2006, including one or more display stands, objects, and screens.

At step 2008, computer 2002 sends the display image that will be received and displayed by projector 2006. The display image has a resolution of, e.g., 1920 by 1080 pixels, which is a native resolution for projector 2006.

At step 2010, a frame of data is sent from range camera 2004 and received by computer 2002. The color data and the depth data are measured by range camera 2004 and are separated into two different byte streams with different resolutions. The color data is 1920 by 1080 by 32 bits with 8 bits for each of red, green, blue, and alpha channels. The alpha channel defaults to 1. The depth data is 640 by 480 by 16 bits with 13 bits for depth information that measures depth from range camera 2004 in 1 millimeter increments.

At step 2012, computer 2002 determines if a trigger area has been touched.

The determination is made by comparing a base line of the depth data received from range camera 2004 with the current depth data received from range camera 2004. In one preferred embodiment, the baseline depth data is an average of three frames of data captured during the calibration process.

In one embodiment, detection of a trigger area is determined by calculating whether 20% or more of a volume associated with the trigger area is occupied for at least three frames in a row. One example of code for performing this function is shown in the computer program listing appendix in the computer program listing of the file named MainWindow.xaml.cs at lines 494-527. The occupation of the volume is determined by the depth associated with the pixels related to the volume of the trigger area. The depth should be less than the baseline depth, but greater than a threshold depth so that a trigger area is only activated by an object that is near the real world location of the trigger area.

In another embodiment, for each pixel of a trigger area that is occupied, the surrounding eight pixels (forming a 3 by 3 or nine pixel matrix) are tested to see if they are each similarly occupied. This additional precision allows for the touch of a single finger to activate a trigger area.

At step 2014, computer 2002 updates the display image to be sent to projector 2006 based on frame data received from range camera 2004. When no trigger areas are clicked or activated, the display image is updated for content areas that includes video. When a trigger area is properly activated, the content areas associated with that trigger area are activated.

At step 2016, computer 2002 sends the updated image. The updated image is based on the content being displayed and the interaction with trigger areas.

Figure 20B:
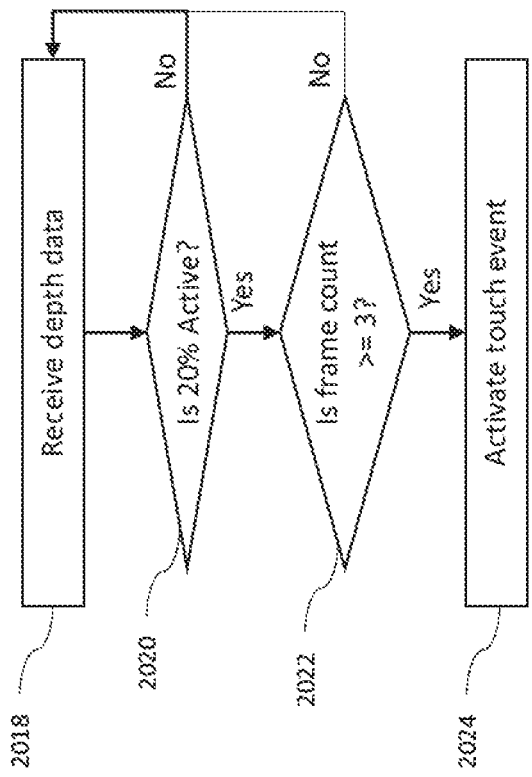

FIG. 20B is a flow chart for determining a touch of a trigger area in accordance with one embodiment of the disclosure. One example of code for performing steps analogous to the steps of the flow chart of FIG. 20B is shown in the computer program listing appendix in the computer program listing of the file named MainWindow.xaml.cs at lines 494-527.

At step 2018, depth data is received from a camera, such as range camera 2004 of FIG. 20. In a preferred embodiment, the depth data has a resolution of 640 by 480 pixels with 13 bits of depth information per pixel and aligned to 16 bits.

At step 2020, a determination is made as to whether 20% or more of the trigger volume associated with a trigger area has been filled by an object. Each pixel of the depth data related to the trigger volume is compared to its corresponding baseline depth to determine if the pixel includes an object that is a threshold amount above the baseline depth. When 20% or more of the pixels associated with the trigger volume have are determined to include an object, then a frame counter is incremented and the method proceeds to step 2022. Otherwise, the frame counter is decremented to a minimum value of zero and the method returns to step 2018 to wait for the next frame of depth data.

At step 2022, the frame count for the trigger area is compared. In a preferred embodiment, an object must be detected in relation to the touchable are for three consecutive frame of data. When it has been detected for three consecutive frames of data, the method proceeds to step 2024. Otherwise, the method returns to step 2018 to wait from the next frame of depth data.

At step 2024, an object of sufficient size has been detected a sufficient number of times to activate a touch event that is associated with the trigger area. In a preferred embodiment the touch event is a mouse click event that is associated with a trigger control associated with the trigger area that causes the display of content via a content control onto the content area. The content displayed in the content area may be static, dynamic, or streamed.

Figure 21A:
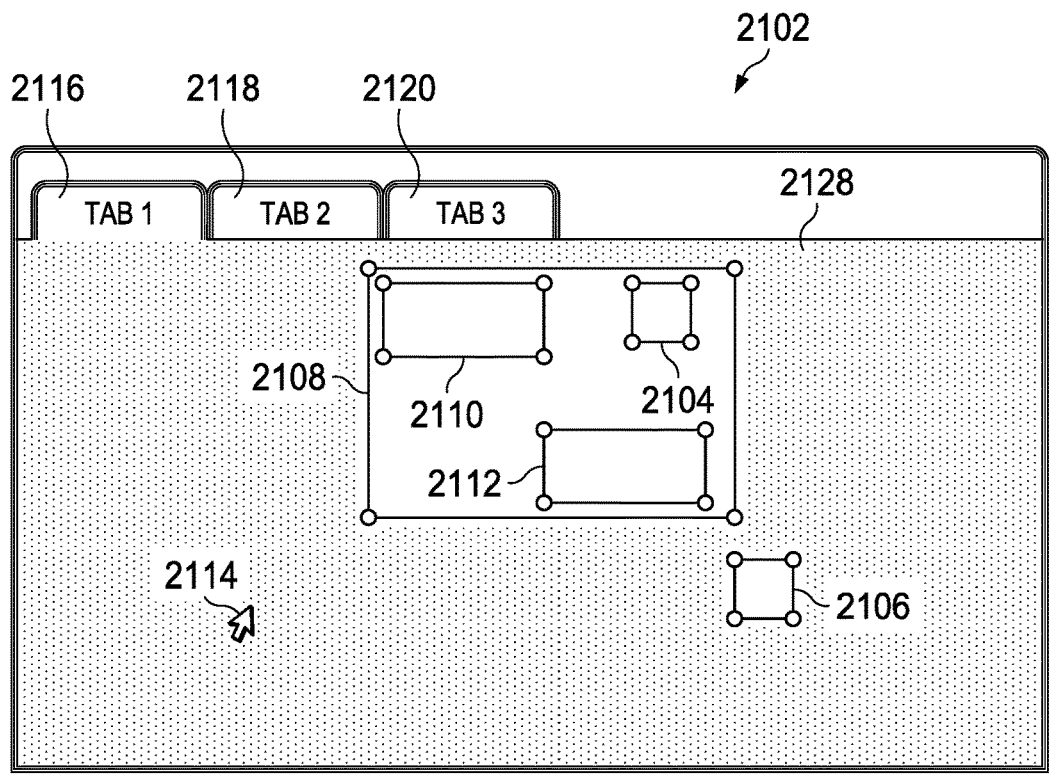
FIG. 21A is a view of the application when a first tab is selected in accordance with one embodiment of the disclosure.
Figure 21B:
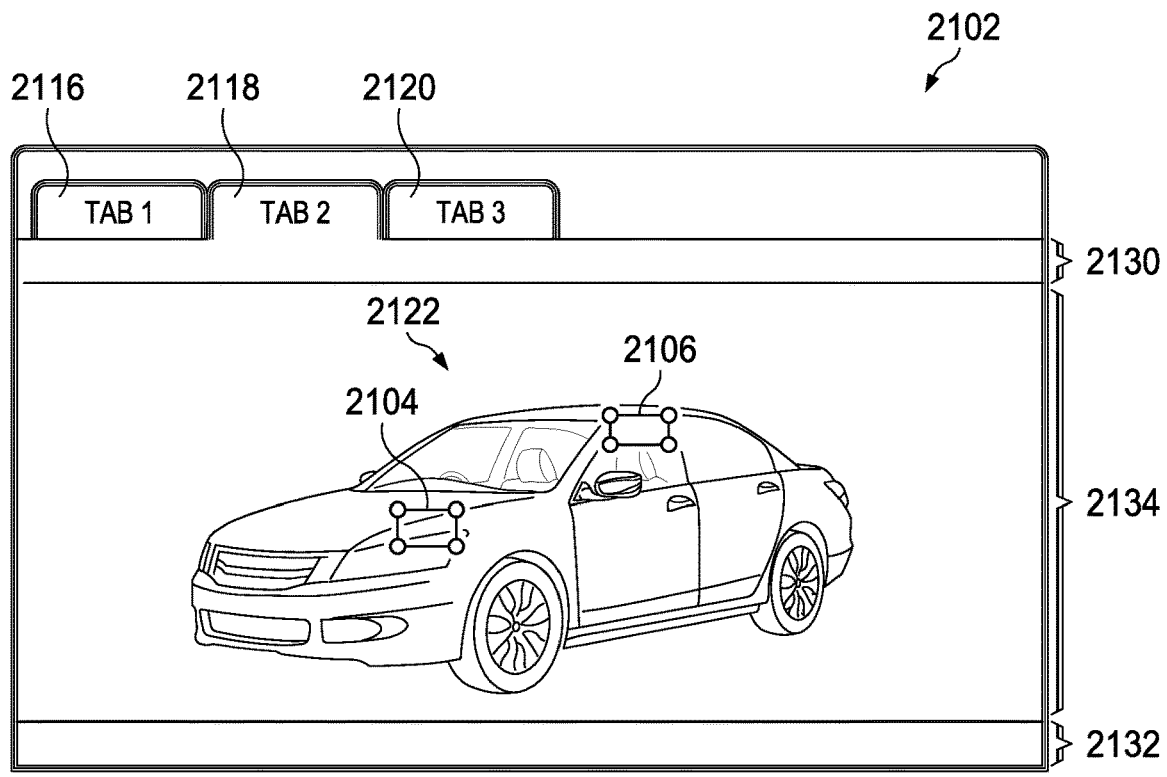
FIG. 21B is a view of the application when a second tab is selected in accordance with one embodiment of the disclosure.

In FIGS. 21A and 21B, a system is being calibrated to display content onto an object. A touchable area application, such as touchable area application 1802 of FIG. 18, includes tabs 2116, 2118, and 2120 that allow for switching between different modes-such as modes 1910, 1912, and 1914 of FIG. 19A—in the touchable area application for calibration. The first mode to add, associate, and manipulate trigger areas and content areas is accessed by selecting tab 2116. The second mode to identify the three-dimensional real world location of the trigger areas associated with trigger controls is accessed by selecting tab 2118. The third mode to display, align, and manipulate the content areas with respect to the object is accessed by selecting tab 2120.

FIG. 21A is a view of the application when a first tab is selected. When first tab 2116 is selected, the application window 2102 is seen on a first display, which is connected to and may be substantially co-located with a computer, such as computer 1902 of FIG. 19A. Displaying application window 2102 on the first display allows a user to set up the trigger areas and content areas for the system along with the linking and interaction behaviors associated with the trigger controls, content controls, trigger areas, and content areas. Trigger controls 2104 and 2106 are displayed in application window 2102. Application window 2102 also displays content control 2108, content control 2110, content control 2112 and mouse pointer 2114. Application window 2102 also includes tabs 2116, 2118, and 2120. Background 2128 of application window 2102 is black.

Trigger control 2104 is associated with content control 2110. When the system is running and trigger control 2104 is touched, the content of content control 2110 will be played on top of the content of content control 2108. Similarly, trigger control 2106 is associated with content control 2112 so that touching or clicking trigger control 2106 plays the media or content of content control 2112 on top of the content of content control 2108.

Content control 2108 includes the default content that is normally displayed by the system. In the embodiment of FIGS. 21A and 21B, content control 2108 is linked to a static image of an engine, such as the engine of car 2122. Content control 2110 is linked to trigger control 2104 and includes a video of the performance characteristics of the object, i.e., car 2122 of FIG. 21B. Content control 2112 is linked to a video of the safety systems of car 2122 and is associated with trigger control 2106.

FIG. 21B is a view of the application when second tab 2118 is selected. When second tab 2118 is selected, instead of showing content controls on background 2128, application window 2102 shows a combination of color and depth data from the camera. When there is no depth data for a pixel, the pixel is shown as black. Otherwise, the RGB (red green blue) color value from the camera is shown. In one embodiment when the resolution of the color data does not match the resolution of the depth data, parts of the image where there is no color data are shown only using the depth data, such as in areas 2130 and 2132. Area 2134 is shown using the combination of color and depth data and areas 2130 and 2132 are shown using only depth data since there is no color data for that portion. Alternative embodiments show any one or combination of color data and depth data on application window 2102.

Trigger controls 2104 and 2106 can be dragged to any part of the view shown application window 2102 in FIG. 21B. When a trigger control is moved, it is associated with the three-dimensional physical location that corresponds with the pixels displayed in application windows 2102 in FIG. 21B. A touch box is created for the trigger area associated with the trigger control so that when it is determined that an object sufficiently fills the touch box, the trigger control is activated by creating a virtual mouse click for the trigger control associated with the trigger area in the display area of the touchable area application.

In an additional embodiment, when the projector can display an image in view of the camera, the projector flashes an image related to the size and location of the trigger area. When the flashing image related to the trigger area is identified from the color data from the camera, the three dimensional coordinates that correspond to the trigger area are identified from the depth data and are associated with the trigger control to automatically calibrate the three dimensional location of the trigger area with the trigger control.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

The invention claimed is:

1. A system for interactively updating a display on a surface, comprising:
   a computer;
   a camera collecting color data comprising image color data and depth data comprising distance to target information,
   wherein the depth data is determined utilizing frame data, relating to a three dimensional trigger area,
   wherein at least two frames of data are compared for detecting a change in depth to determine a trigger event within the three dimensional trigger area; and
   a projector, the projector displaying a projected image on the surface based on the determined trigger event,
   wherein the computer performs a transform on a first image file corresponding to a mathematical representation of a complex shape of the surface and generating a file corresponding to the projected image by modifying the first image file to counteract distortions associated with the complex shape and wherein the computer is configured to perform a perspective projection transform of the first image file.

2. The system of claim 1, wherein the computer is configured to perform a non-affine transform on the first image file.

3. The system of claim 1, wherein the projector is configured to:
perform an affine transform on the base image file to create an intermediate image file; and
wherein the first image file is the intermediate image file.

4. The system of claim 1, wherein detecting a change in depth to determine a trigger event within the three dimensional trigger area further comprises comparing a pixel of the depth data that is related to the volume that is associated with the three dimensional trigger area to a corresponding baseline depth to determine if the pixel includes an object that is a threshold amount above the baseline depth.

5. The system of claim 4, wherein detecting a change in depth to determine a trigger event within the three dimensional trigger area further comprises testing eight pixels that surround an occupied pixel of the three dimensional trigger area to confirm that each of the eight surrounding pixels are also occupied.

6. The system of claim 4, wherein detecting a change in depth to determine a trigger event within the three dimensional trigger area further comprises calculating whether 20% or more of the volume associated with the three dimensional trigger area is occupied for at least three frames of data.

7. The system of claim 3, further comprising:
a display;
the computer further configured to:
  receiving a selection of a first tab of an application;
  sending a control image to the display based on the selection of the first tab; adding a trigger control to the application; and,
  updating the trigger control based on a movement of a corner of the trigger control.

8. A method comprising updating a display on a surface:
capturing an image and generating a frame of data with a camera, the frame of data relates to a three dimensional trigger area related to the surface,
utilizing the frame of data to retrieve a set of depth data;
comparing at least two frame of data for detecting a change in depth and determining a trigger event occurred within the three dimensional trigger area comparing the set of depth data associated with two or more frame of data; and
displaying a projected image on the surface based on the determined trigger event, wherein the step of displaying on the surface includes:
  performing a transform on a first image file corresponding to a mathematical representation of a shape of the surface and generating a file corresponding to the projected image by distorting a first image file, and wherein the frame of data generated via the camera includes image color data and distance to target information, the distance to target information of the frame of data utilized for the retrieving the set of the depth data and wherein the step of displaying on the surface comprises performing a perspective projection transform of the first image file.

9. The method of claim 8, wherein the step of displaying on the surface comprises performing a non-affine transform on the first image file.

10. The method of claim 8, wherein the step of displaying on the surface further comprises:

performing an affine transform on the base image file to create an intermediate image file; and
wherein the first image file is the intermediate image file.

11. The method of claim 2:
wherein the step of detecting further comprises:
comparing a pixel of the depth data that is related to a trigger volume that is associated with the trigger area to a corresponding baseline depth to determine if the pixel includes an object that is a threshold amount above the baseline depth.

12. The method of claim 11, further comprising:
receiving a selection of a first tab of an application;
sending a control image to a display based on the selection of the first tab;
adding a trigger control to the application; and,
updating the trigger control based on a movement of a corner of the trigger control.

13. The method of claim 12, further comprising:
receiving a selection of a second tab of the application;
updating the control image sent to the display to include the color data and the depth data after the second tab is selected; and,
associating the three dimensional trigger area and the trigger volume with the trigger control.

14. A non-transitory storage computer readable medium comprising computer program instructions that when executed cause a computer to perform the steps of:
sending a first image file to the projector thereby causing the projector to display a first image on a curved surface, wherein sending the first image file comprises performing a transform on a rectilinear image file to introduce non-rectilinear modifications to the rectilinear image file;
receiving a frame of data from an camera;
comparing a set of depth data associated with two or more frame of data, wherein the camera is utilized to retrieve data related to depth and color;
detecting a trigger event related to a change in depth within a three dimensional trigger area of the displayed first image on the surface; and,
displaying a second image on the surface based on the trigger event and wherein the step of displaying on the surface comprises performing a perspective projection transform of the first image file.

15. The computer readable medium of claim 14, wherein the step of displaying on the surface comprises performing a non-affine transform on the first image file.

16. The computer readable medium of claim 14, wherein the step of sending the first image file further comprises selecting the introduced non-rectilinear modifications to counteract visual distortions associated with a curve of the surface, wherein the non-rectilinear modifications cause the displayed first image to appear rectilinear on the curved surface.

17. The computer readable medium of claim 15, further comprising:
receiving, by the computer, a selection of a first tab of an application;
sending, by the computer, a control image to a display based on the selection of the first adding, by the computer, a trigger control to the application;
updating, by the computer, the trigger control based on a movement of a corner of the trigger control;
receiving, by the computer, a selection of a second tab of the application;

updating, by the computer, the control image sent to the display to include the color data and the depth data after the second tab is selected; and, associating, by the computer, the three dimensional trigger area and the trigger volume with the trigger control.

* * * * *